United States Patent
Halliday et al.

(10) Patent No.: US 9,499,181 B2
(45) Date of Patent: Nov. 22, 2016

(54) ZIPLINE BRAKING SYSTEM

(71) Applicant: TAG ADVENTURE TOURS LTD., Whistler, British Columbia (CA)

(72) Inventors: David J. Halliday, Maple Ridge (CA); Siegfried F. Stiemer, Surrey (CA)

(73) Assignee: TAG Adventure Tours Ltd., British Columbia (CA)

( * ) Notice: Subject to any disclaimer, the term of this patent is extended or adjusted under 35 U.S.C. 154(b) by 0 days.

(21) Appl. No.: 14/365,466

(22) PCT Filed: Dec. 14, 2012

(86) PCT No.: PCT/CA2012/001155
§ 371 (c)(1),
(2) Date: Jun. 13, 2014

(87) PCT Pub. No.: WO2013/086622
PCT Pub. Date: Jun. 20, 2013

(65) Prior Publication Data
US 2014/0326161 A1 Nov. 6, 2014

Related U.S. Application Data

(60) Provisional application No. 61/570,410, filed on Dec. 14, 2011.

(51) Int. Cl.
| | |
|---|---|
| *B61H 9/00* | (2006.01) |
| *B61H 9/02* | (2006.01) |
| *A63G 21/20* | (2006.01) |
| *B61B 7/00* | (2006.01) |
| *F16D 63/00* | (2006.01) |

(52) U.S. Cl.
CPC ............. *B61H 9/02* (2013.01); *A63G 21/20* (2013.01); *B61B 7/00* (2013.01); *F16D 63/008* (2013.01)

(58) Field of Classification Search
CPC ........... B61H 9/02; B61B 21/20; B61B 7/00; B61B 12/00
See application file for complete search history.

(56) References Cited

U.S. PATENT DOCUMENTS

| | | | |
|---|---|---|---|
| 7,381,137 B2 | 6/2008 | Steele et al. | |
| 8,960,098 B2* | 2/2015 | Boren | B61B 12/00 104/117.1 |
| 2006/0027134 A1* | 2/2006 | Steele | B61B 7/00 104/113 |
| 2006/0283349 A1* | 12/2006 | Mitchell | B61B 12/005 104/113 |
| 2009/0014259 A1* | 1/2009 | Cylvick | A63G 21/22 188/42 |
| 2009/0255436 A1* | 10/2009 | Buckman | A63G 21/22 104/117.1 |

(Continued)

OTHER PUBLICATIONS

International Search Report prepared by the Canadian Intellectual Property Office on Jan. 22, 2013, for International Application No. PCT/CA2012/001155.

(Continued)

*Primary Examiner* — Jason C Smith
(74) *Attorney, Agent, or Firm* — Sheridan Ross P.C.

(57) ABSTRACT

A zipline braking system comprising a zipline cable and a destination supporting member; a rider carrier coupled to the zipline cable for movement towards the destination supporting member, such movement generating kinetic energy; a damper having a posterior end and an anterior end and connected to the destination supporting member at the posterior end; a tension line; a stopping member coupled to the zipline cable and the tension line; and the tension line for transferring the kinetic energy to the damper upon the rider carrier engaging the stopping member in movement to the destination supporting member.

27 Claims, 22 Drawing Sheets

(56) References Cited

U.S. PATENT DOCUMENTS

| | | | | |
|---|---|---|---|---|
| 2011/0162917 A1* | 7/2011 | Steele | A63G 21/22 188/65.2 |
| 2011/0232520 A1* | 9/2011 | Witherspoon | B61B 7/02 104/113 |
| 2012/0145498 A1* | 6/2012 | Liston | A63G 21/20 188/378 |
| 2013/0239842 A1* | 9/2013 | Boren | B61B 7/00 104/113 |
| 2014/0158012 A1* | 6/2014 | Hackett | F16D 63/008 104/113 |
| 2014/0326161 A1* | 11/2014 | Halliday | A63G 21/20 104/113 |
| 2015/0135983 A1* | 5/2015 | Halliday | F16D 63/008 104/113 |

OTHER PUBLICATIONS

Official Action for U.S. Appl. No. 14/519,693, mailed Aug. 13, 2015, 6 pages.

Official Action for U.S. Appl. No. 14/519,693, mailed Mar. 4, 2016, 12 pages.

* cited by examiner

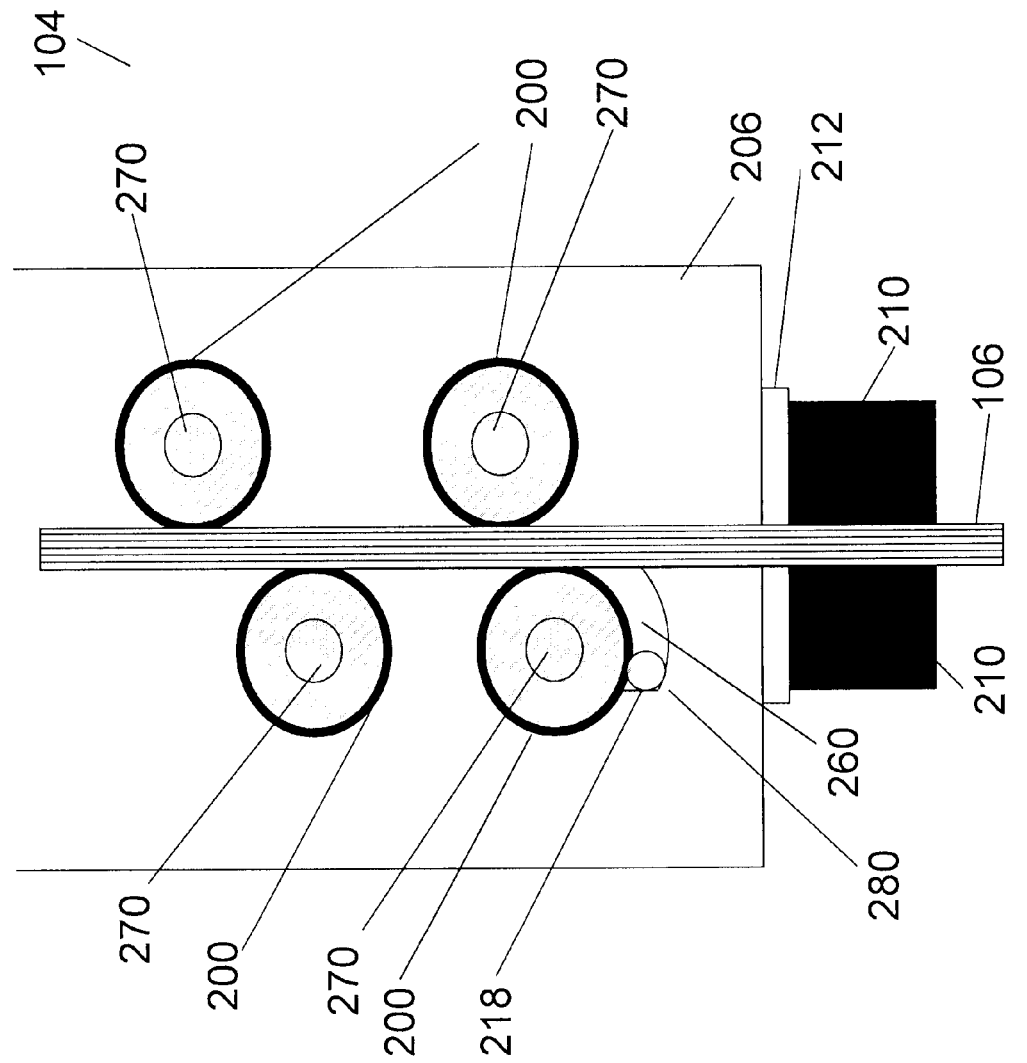

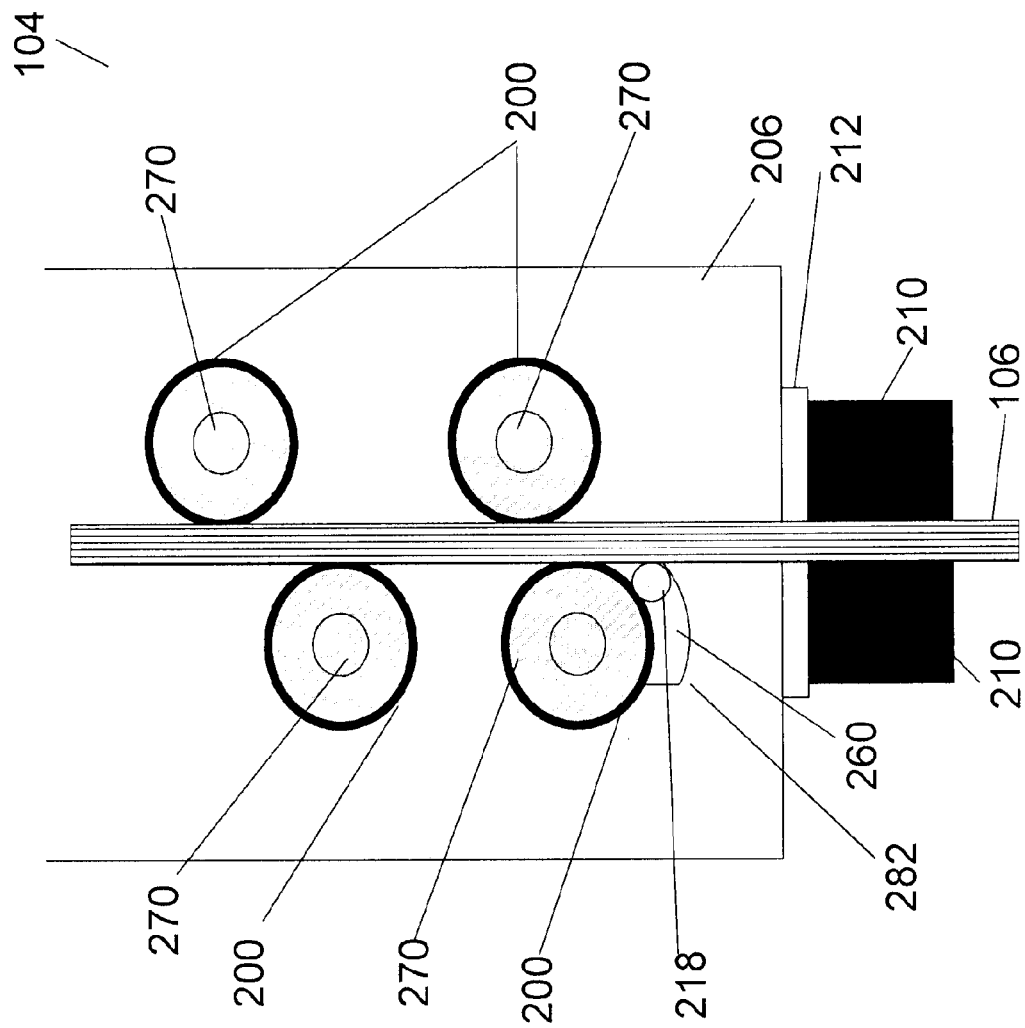

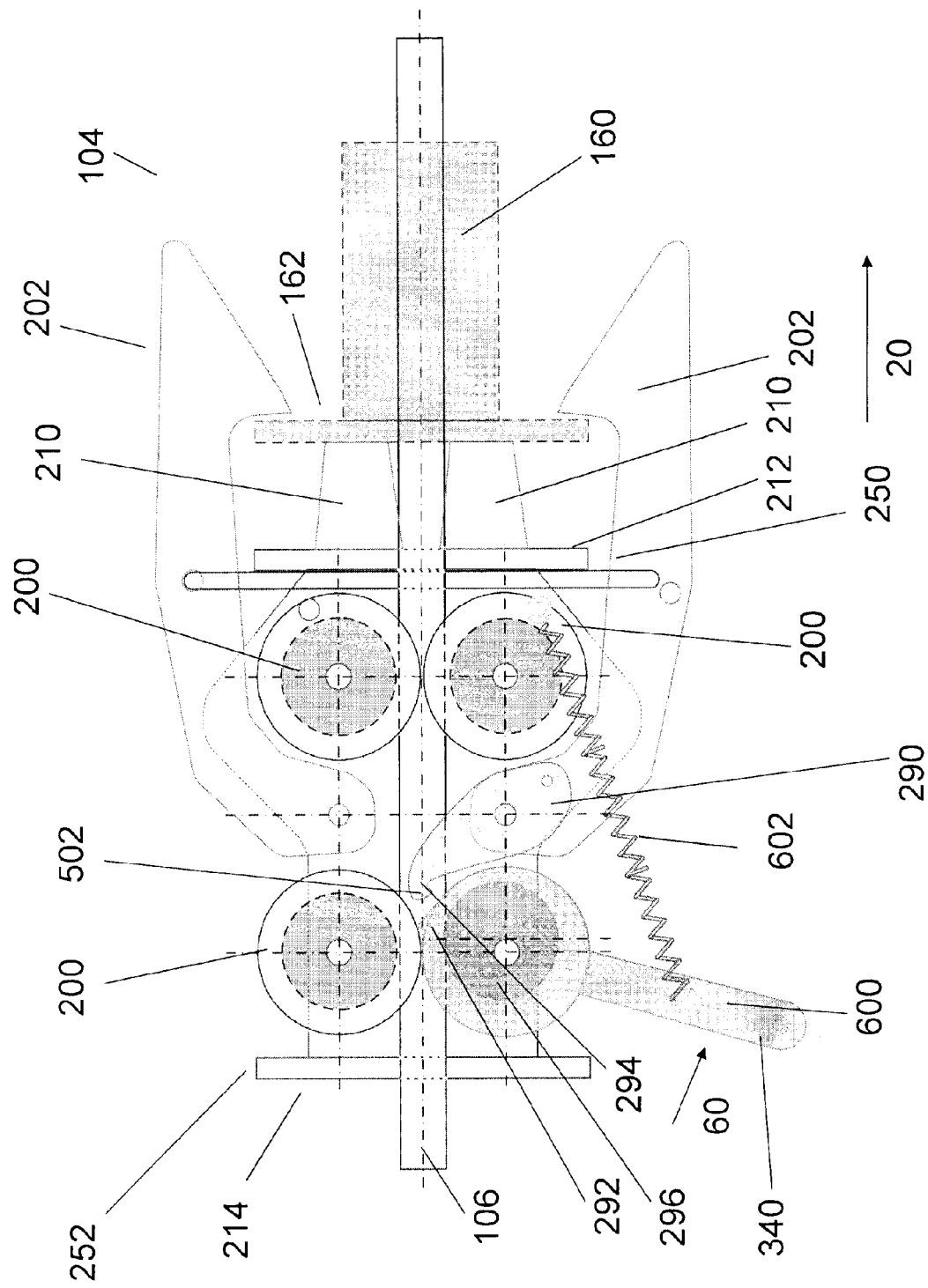

ZIPLINE BRAKING SYSTEM

CROSS REFERENCE TO RELATED APPLICATIONS

This application is a national stage application under 35 U.S.C. 371 and claims the benefit of PCT Application No. PCT/CA2012/001155 having an international filing date of Dec. 14, 2012, which designated the United States, which PCT application claims the benefit of U.S. Provisional Patent Application No. 61/570,410, filed Dec. 14, 2011, the disclosures of which are incorporated herein by reference.

FIELD OF THE INVENTION

The invention relates to ziplines, and more specifically to a zipline braking system for decelerating a zipline rider as the rider reaches the end of the zipline.

BACKGROUND

Ziplines allow riders to travel from one point to another. They are used for various purposes, including as thrill rides and tourist attractions. Ziplines generally include two supports and a cable suspending between the two. There is generally an area on each support, usually a platform, to allow riders to embark and disembark from the zipline. Harnesses and pulleys are used for transporting and providing support to the zipline riders.

Several different zipline braking systems have been adopted by zipline operators. Some systems require a rider to move a static mass of springs whereas others incorporate a speed limiting trolley. Other zipline braking systems involve guide operated ropes that are dependent on a human guide applying friction to a rope attached to a catch block as the zipline rider reaches the end of the zipline ride. As such, these systems are susceptible to human errors. In addition, zipline riders often complain that present braking systems cause pain to their necks or backs due to the dramatic speed decrease upon a zipline rider reaching the end of the zipline. Some braking systems also create a loud crashing sound that is not appealing to zipline riders.

A need therefore exists for an improved zipline braking system. Accordingly, a solution that addresses, at least in part, the above and other shortcomings is desired.

SUMMARY OF THE INVENTION

According to one aspect of the invention, there is provided a zipline braking system comprising: a zipline cable and a destination supporting member; a rider carrier coupled to the zipline cable for movement towards the destination supporting member, such movement generating kinetic energy; a damper having a posterior end and an anterior end and connected to the destination supporting member at the posterior end; a tension line; a stopping member coupled to the zipline cable and the tension line; and the tension line for transferring the kinetic energy to the damper upon the rider carrier engaging the stopping member in movement to the destination supporting member.

According to another aspect of the invention, there is provided a method for decelerating a rider carrier travelling towards a destination supporting member along a zipline, the destination supporting member having a damper, the method comprising providing a stopping member coupled to the zipline cable and a tension line; and transferring kinetic energy of the rider carrier to the damper with the tension line upon engagement of the rider carrier with the stopping member.

According to another aspect of the invention, there is provided a zipline rider stopping member comprising: a cavity for coupling to a zipline cable; and a braking member having an engaged position wherein the braking member frictionally engages the zipline cable to prevent the stopping member from moving in a direction along the zipline cable and a disengaged position wherein the braking member does not engage the zipline cable.

According to another aspect of the invention, there is provided a zipline riding system, comprising: an origination supporting member and a destination supporting member; a damper connected to the destination supporting member; a rider carrier coupled to a zipline cable for movement from the origination supporting member to the destination supporting member; and, a braking system including: a primary stopping member coupled to the zipline cable and a tension line; a secondary stopping member for engaging the damper, the secondary stopping member coupled to the zipline cable and situated between the primary stopping member and the damper; the tension line being led around a foot block and engaging the secondary stopping member; and, the braking system having an uncompressed configuration where the damper is in an uncompressed state and a compressed configuration where the damper is in a compressed state; wherein the rider carrier in movement towards the destination supporting member along the zipline cable engages the primary stopping member, and upon such engagement, the primary stopping member moves toward the destination supporting member and pulls the tension line causing a switch of the braking system from the uncompressed configuration to the compressed configuration to decelerate the rider carrier.

According to another aspect of the invention, there is provided a zipline riding system, comprising: an origination supporting member and a destination supporting member; a damper connected to the destination supporting member; a rider carrier coupled to a zipline cable for movement from the origination supporting member to the destination supporting member; and, a braking system including: a primary stopping member coupled to the zipline cable and a tension line; a secondary stopping member for engaging the damper, the secondary stopping member coupled to the zipline cable and situated between the primary stopping member and the damper; a compression line that engages the secondary stopping member and is led around a movable member; a tension line being led around a foot block not coupled to the zipline and the movable member; and, a braking system having an uncompressed configuration where the damper is in an uncompressed state and a compressed configuration where the damper is in a compressed state; wherein the rider carrier in movement towards the destination supporting member along the zipline cable engages the primary stopping member, and upon such engagement, the primary stopping member moves toward the destination supporting member which moves the movable member away from the destination supporting member, causing the braking system to switch from the uncompressed configuration to the compressed configuration to decelerate of the rider carrier.

According to another aspect of the invention, there is provided a method for decelerating a zipline rider on a rider carrier travelling on a zipline cable from an origination supporting member toward a destination supporting member having a damper, the method comprising: providing a primary stopping member for asserting a deceleration force on the rider carrier in a direction away from the destination supporting member; providing a secondary stopping member for engaging the damper; providing a tension line tied to the primary stopping member; and, engaging the tension line with the secondary stopping member such that movement of the primary stopping member towards the destination supporting member after engagement with the rider carrier leads the tension line to cause the secondary stopping member to move towards the destination supporting member and compression of the damper.

According to further aspects of the invention, the secondary stopping member in the braking system may be tied to an arrester line that is connected to an arrester ballast suspended vertically. The primary stopping member may further include a clutch to prevent the rider carrier from rolling back towards the origination supporting member. The primary stopping member may further include a roll back prevention brake which is an eccentrically anchored roller adjacent to the guide rollers to prevent the primary stopping member from sliding towards the origination supporting member. The primary stopping member may include at least one set of guide rollers for holding the zipline cable, a top plate, a bottom plate, at least one set of gripping claws, an anterior plate, a posterior plate, and bumpers at the posterior of the primary stopping member. An arrester clutch may be applied to the arrester line to prevent the rider carrier from rolling back towards the origination supporting member upon engagement with the damper. The tension line may be further led around a side stand up block connected to the destination supporting member. And, the side stand up block may be situated on a side supporting member to one side of the braking system.

BRIEF DESCRIPTION OF THE DRAWINGS

Features and advantages of the embodiments of the present invention will become apparent from the following detailed description, taken in combination with the appended drawings, in which:

FIG. 3B is a top view illustrating the primary stopping member of FIG. 3A with the top plate removed and an anchored roller in a disengaged position according to an embodiment of the invention;

FIG. 3C is a top view illustrating the primary stopping member of FIG. 3A with the top plate removed and an anchored roller in an engaged position according to an embodiment of the invention;

FIG. 6C is a top view illustrating the primary stopping member of the zipline braking system of FIG. 1 and FIG. 2 in the braking position after engagement with the rider carrier according to an embodiment of the invention;

In the description which follows, like parts are marked throughout the specification and the drawings with the same respective reference numerals.

DETAILED DESCRIPTION OF THE EMBODIMENTS

The description which follows and the embodiments described therein are provided by way of illustration of an example or examples of particular embodiments of the principles of the present invention. These examples are provided for the purposes of explanation and not limitation of those principles and of the invention. In some instances, certain structures and techniques have not been described or shown in detail in order not to obscure the invention.

The present invention is directed generally to a braking system that may enhance the experience of zipline riders through reduction in jarring and abrasive braking. In addition, the present invention may provide for safety redundancy whereby braking and stopping of a zipline rider is done by a primary stopping member, a damper, and/or a secondary stopping member.

According to one embodiment, the present invention provides a zipline braking system that is based partially on conversion of kinetic energy to potential energy temporarily stored in dampers. The stored energy is subsequently used to restore the original geometry of the braking system. The braking system may provide a geometric advantage such that braking of the zipline rider may be done at a reduced impact speed and rate of deceleration.

Figure 1:
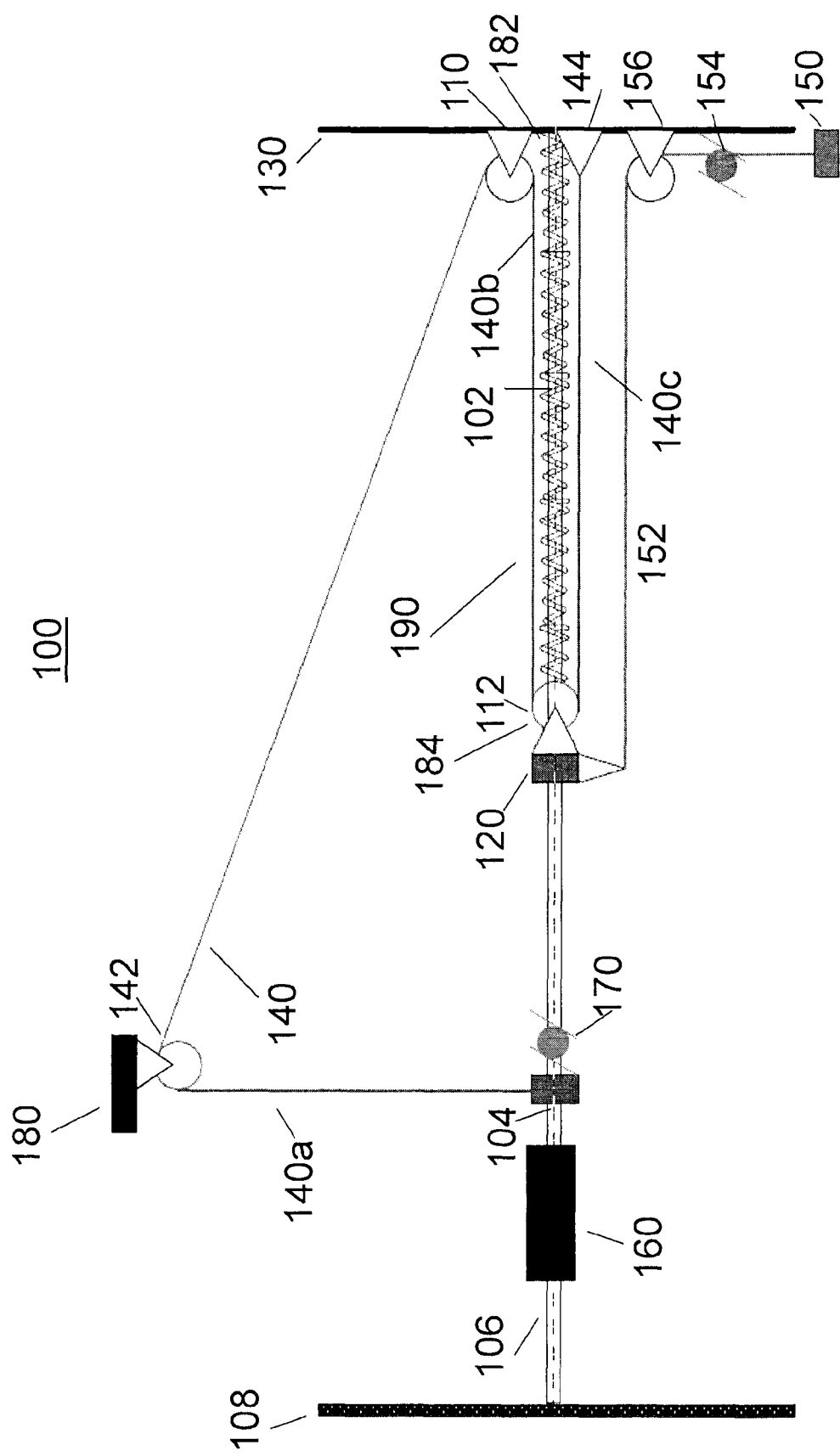
FIG. 1 is a side view illustrating a zipline braking system in an uncompressed configuration according to an embodiment of the invention.
Figure 2:
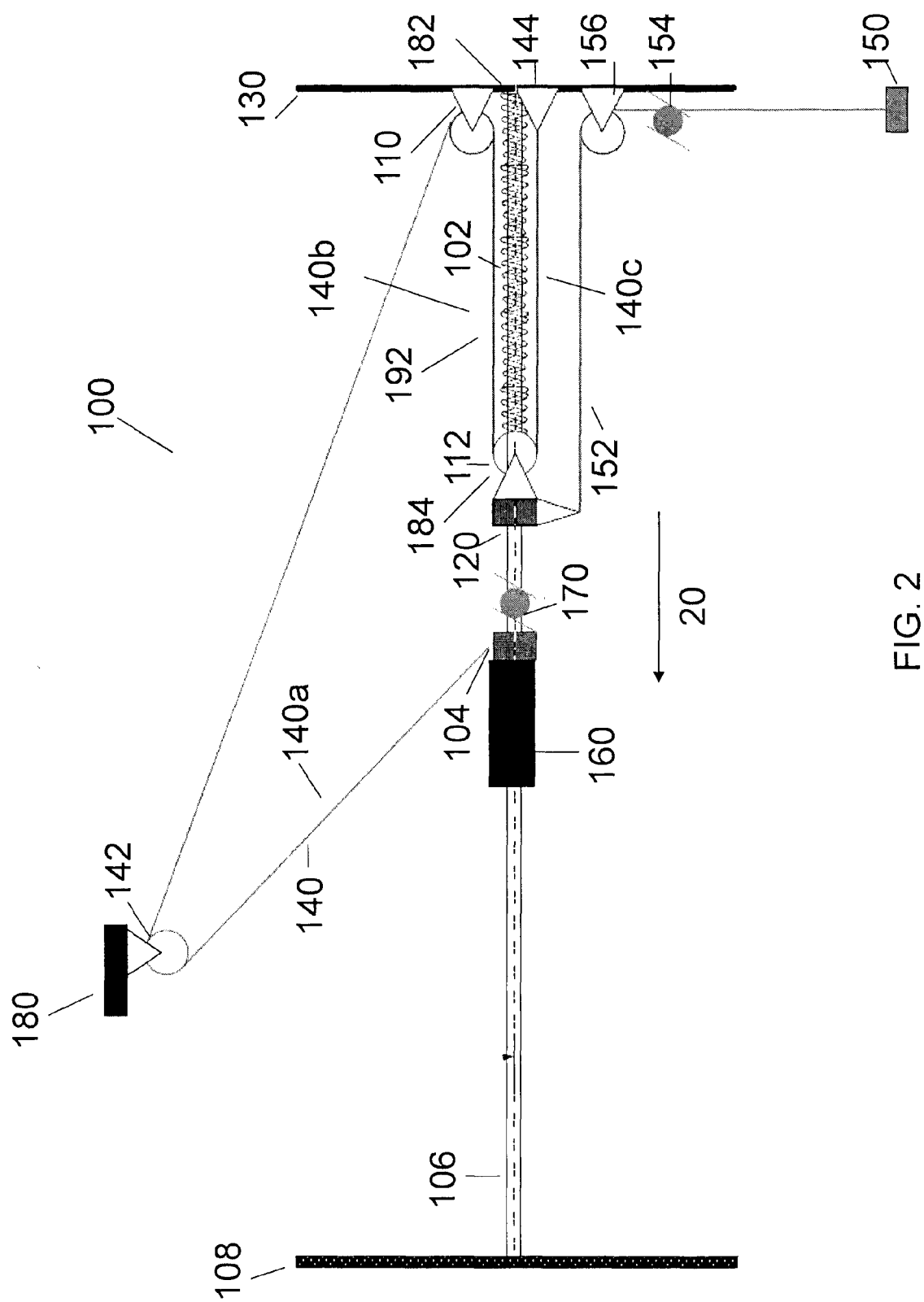
FIG. 2 is a side view illustrating the zipline braking system of FIG. 1 in a compressed configuration according to an embodiment of the invention.

FIG. 1 is a side view illustrating a zipline braking system 100 in an uncompressed configuration 190 according to an embodiment of the invention, and FIG. 2 is a side view illustrating the zipline braking system of FIG. 1 in a compressed configuration 192 according to an embodiment of the invention. According to one embodiment of the present invention as illustrated in FIG. 1 and FIG. 2, a zipline braking system 100 includes a destination supporting member 130 connected to a zipline cable 106, a damper 102 connected to the destination supporting member 130, a base foot block 110 at the posterior end 182 of the damper 102, a front foot block 112 attached to the secondary stopping member 120 and located at the anterior end 184 of the damper 102. In the zipline braking system 100, the secondary stopping member 120 is mounted on the zipline cable 106 and connected to an arrester cable 152. A primary stopping member 104 is connected to a tension line 140, the tension line being led around a side stand-up block 142, the base foot block 110, and the front foot block 112. The arrester cable 152 is connected to an arrester ballast 150 through an arrester clutch 154 and led around an arrester foot block 156. According to one embodiment, the side stand-up block 142 is connected to the destination supporting member 130. In other embodiments, the side stand-up block 142 is connected to a side supporting member 180.

When the zipline is in use, a rider carrier 160 moving from the origination supporting member 108 towards the destination supporting member 130 engages the primary stopping member 104. Upon the rider carrier 160 engaging the primary stopping member 104 when moving towards the destination supporting member 130, the rider carrier 160 causes the primary stopping member 104 to move towards the destination supporting member 130 (such engagement also causing a decelerating force to be exerted on the rider carrier 160 in a direction 20 away from the destination supporting member 130, as described below). The movement of the primary stopping member 104 creates tension in the tension line 140, and the tension in the tension line 140 causes compression of the damper 102. The compression of the damper 102 and movement of the primary stopping member 104 result in an increase in length of a segment 140a of the tension line 140 between the side stand-up block 142 and the primary stopping member 104. Such compression and movement also decrease the length of segments 140b and 140c of the tension line 140 (that is fixed to the securing member 144 on the destination supporting member 130 and led around the front foot block 112 and the base foot block 110) around the damper 102. The decrease in the tension line segments 140b and 140c cause the secondary stopping member 120 to move towards the destination support member 130 and further compressing the damper 102. As such, the movement of the primary stopping member 104 causes the braking system 100 to change from the uncompressed configuration 190 to the compressed configuration 192 as the damper 102 compresses. According to one embodiment, the securing member 144 is a clutch. According to other embodiments, the securing member 144 may be a cam cleat, a jam cleat, or a clam cleat. According to another embodiment, the securing member 144 may be a marine grade horn cleat rated for loads that are higher than 3,000 pounds in weight.

Figure 3A:
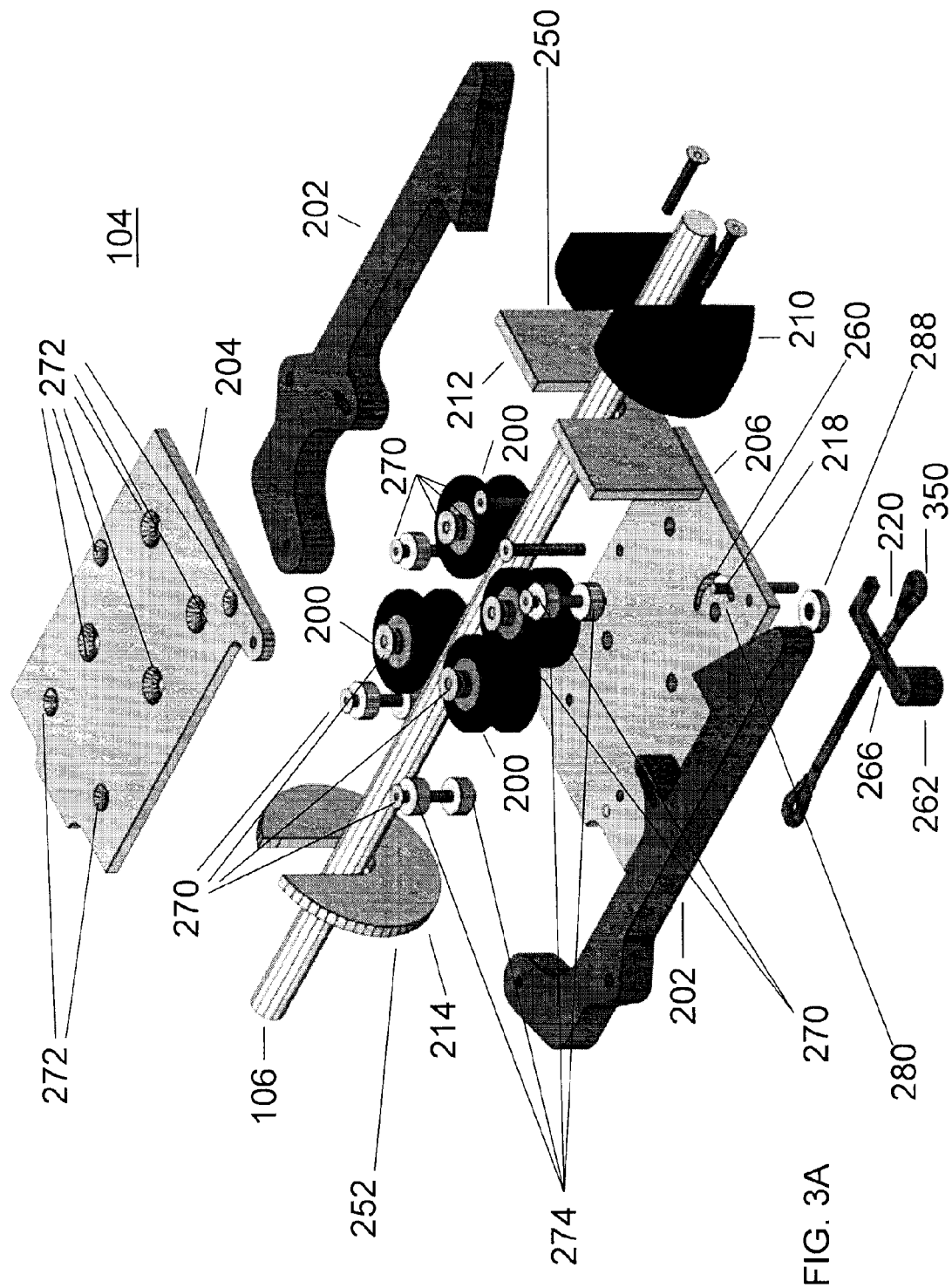
FIG. 3A is an exploded view illustrating the primary stopping member of the zipline braking system of FIG. 1 and FIG. 2 according to an embodiment of the invention.
Figure 4:
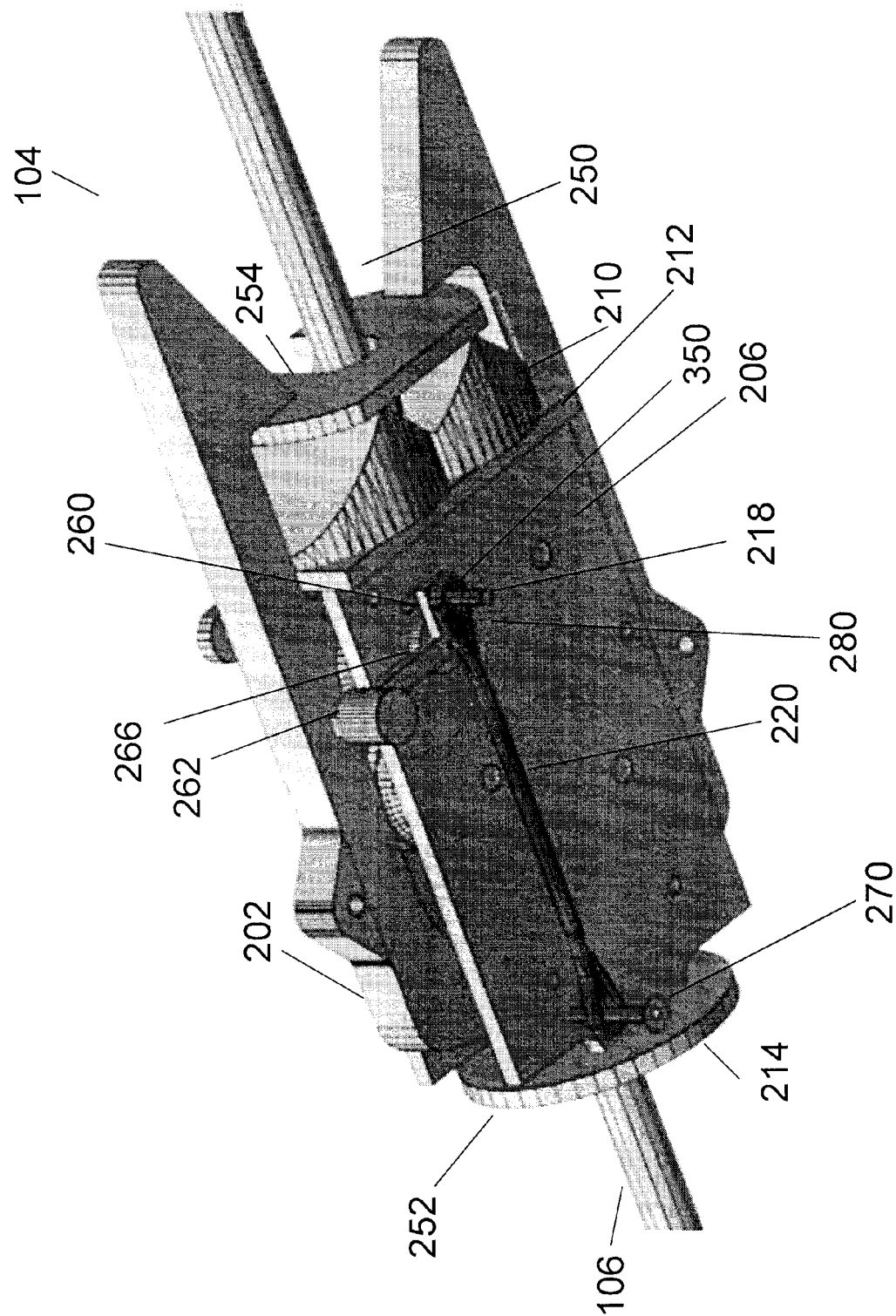
FIG. 4 is a perspective view illustrating the bottom of the primary stopping member of the zipline braking system of FIG. 1 and FIG. 2 according to an embodiment of the invention.
Figure 5:
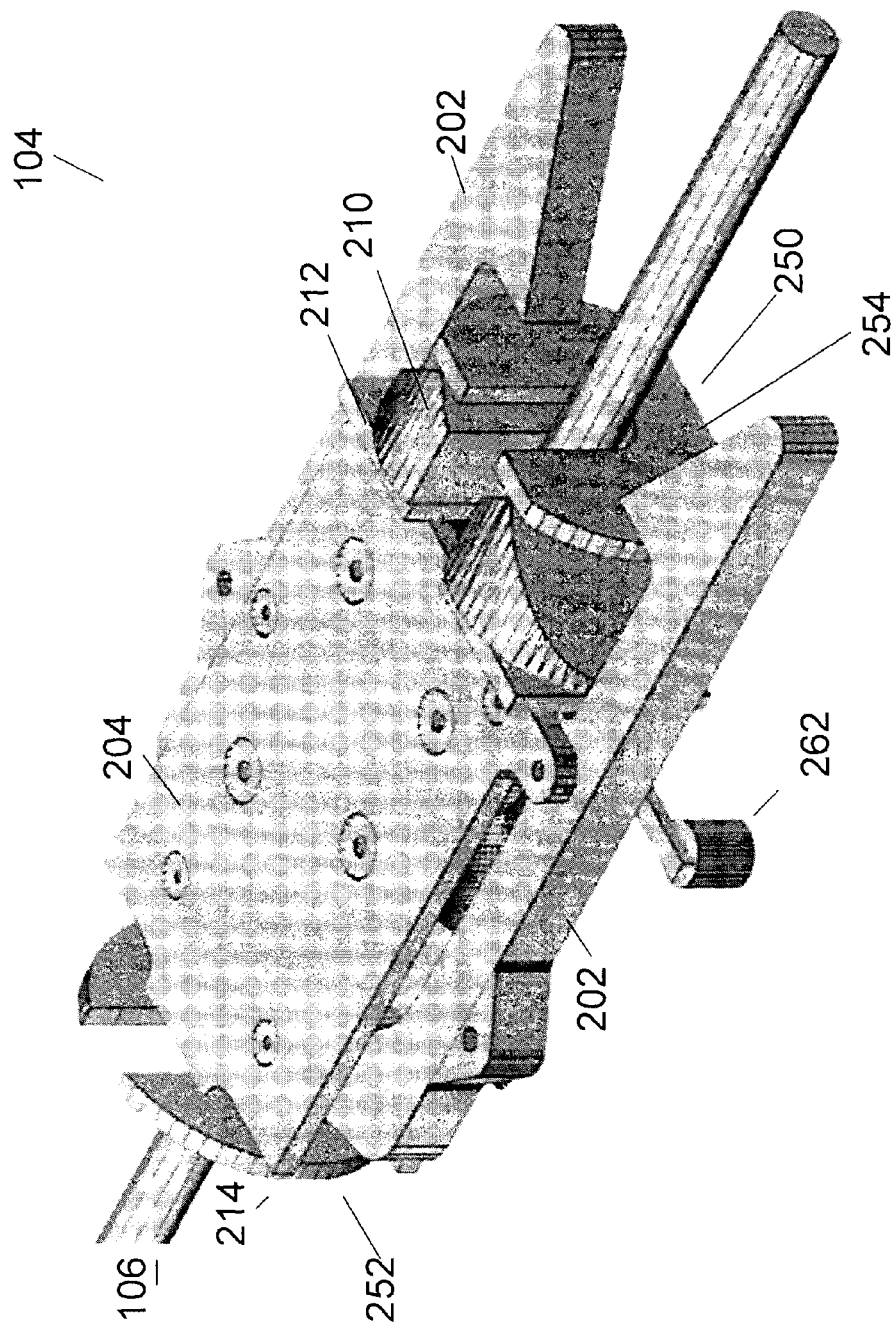
FIG. 5 is a perspective view illustrating the primary stopping member of the zipline braking system of FIG. 1 and FIG. 2 according to an embodiment of the invention.

FIG. 3A is an exploded view illustrating the primary stopping member 104 of the zipline braking system 100 of FIG. 1 and FIG. 2 according to an embodiment of the invention. FIG. 3B is a top view of the primary stopping member 104 of FIG. 3A with a top plate 204 removed and of an anchored roller 218 in a disengaged position 280 according to an embodiment of the invention. FIG. 3C is a top view of the primary stopping member 104 of FIG. 3A with the top plate 204 removed and of the anchored roller 218 in an engaged position 282 according to an embodiment of the invention. FIG. 4 is a perspective view illustrating the bottom of the primary stopping member 104 of the zipline braking system of FIG. 1 and FIG. 2 according to an embodiment of the invention. FIG. 5 is a perspective view illustrating the primary stopping member 104 of the zipline braking system 100 of FIG. 1 and FIG. 2 according to an embodiment of the invention. As illustrated in FIGS. 3A, 4, and 5, according to one embodiment, the primary stopping member 104 is mounted on the zipline cable 106 and is held in place on the zipline cable 106 with at least one set of guide rollers 200, one roller on each side of the zipline cable 106. According to other embodiments, the primary stopping member 104 comprises the top plate 204, a bottom plate 206, at least one set of gripping claws 202, an anterior plate 214 at the anterior end 252 of the primary stopping member 104, a posterior plate 212, and bumpers 210 at the posterior end 250 of the primary stopping member 104 for engaging the rider carrier 160. The primary stopping member 104 may further comprise an engagement plate 254 in front of the bumpers 210 at the posterior end of the primary stopping member 104. The top plate 204 and the bottom plate 206 may be held together by screws 270 and nuts 274 or other fasteners known to a person skilled in the art and may contain screw slots 272. In other embodiments, the primary stopping member 104 may include 2 sets of guide rollers 200, two rollers on each side of the zipline cable 106.

The primary stopping member 104 may be made of a light weight material. The gripping claws 202, top plate 204, bottom plate 206, posterior plate 212, and anterior plate 214 may be made of aluminum, steel, cast iron, plastic, carbon fibre, or a combination of materials known to persons skilled in the art. The bumpers 210 may be made of rubber or other shock absorbing materials known to a person skilled in the art.

As illustrated in FIGS. 3B and 3C, according to one embodiment, the primary stopping member 104 further comprises a roll back prevention brake which includes an eccentrically anchored roller 218 mounted adjacent to the guide rollers 200. When primary stopping member 104 moves towards the destination supporting member 130, the guide roller 200 adjacent to the anchored roller 218 rotates in a clockwise manner and forces the anchored roller to slide into the disengaged position 280. When the primary stopping member 104 slides in a direction away from the destination supporting member 130, the guide roller 200 adjacent to the anchored roller 218 rotates in a counter-clockwise manner and forces the anchored roller 218 to move from the disengaged position 280 to the engaged position 282. In the disengaged position 280, the primary stopping member 104 can move freely along the zipline cable 106. In the engaged position 282, the anchored roller frictionally engages the zipline cable 106 and its adjacent guide roller 200 to prevent any roll-back movement of the primary stopping member 104 towards the origination supporting member 108. In one embodiment, upon the primary stopping member 104 engaging the rider carrier 160 at the posterior end 250 of the primary stopping member 104, such engagement causes a mass 262 mounted on a lever arm 266 to move in a direction to cause the anchored roller 218 to switch to the engaged position 282. The anchored roller 218 can be set to the disengaged position 280 to permit resetting of the primary stopping member 104 to allow the braking system 100 to switch from the compressed configuration 192 to the uncompressed configuration 190. As illustrated in FIGS. 3A, 4, and 5, according to one embodiment, a spring-loaded mechanism 220 having a cavity 350 is used for changing the anchored roller 218 from the engaged position 282 to the disengaged position 280. A slot 260 formed in the bottom plate 206 allows the anchored roller 218 to connect to the spring-loaded mechanism 220 with an anchored roller nut 288 through the cavity 350 on the spring loaded mechanism 220. One end of the spring loaded mechanism 220 is attached to the bottom plate 206 with a screw 270. In other embodiments, the primary stopping member 104 further includes a clutch 170 as shown on FIG. 1 and FIG. 2 to prevent the primary stopping member 104 from rolling back towards the origination supporting member 108.

Figure 6A:
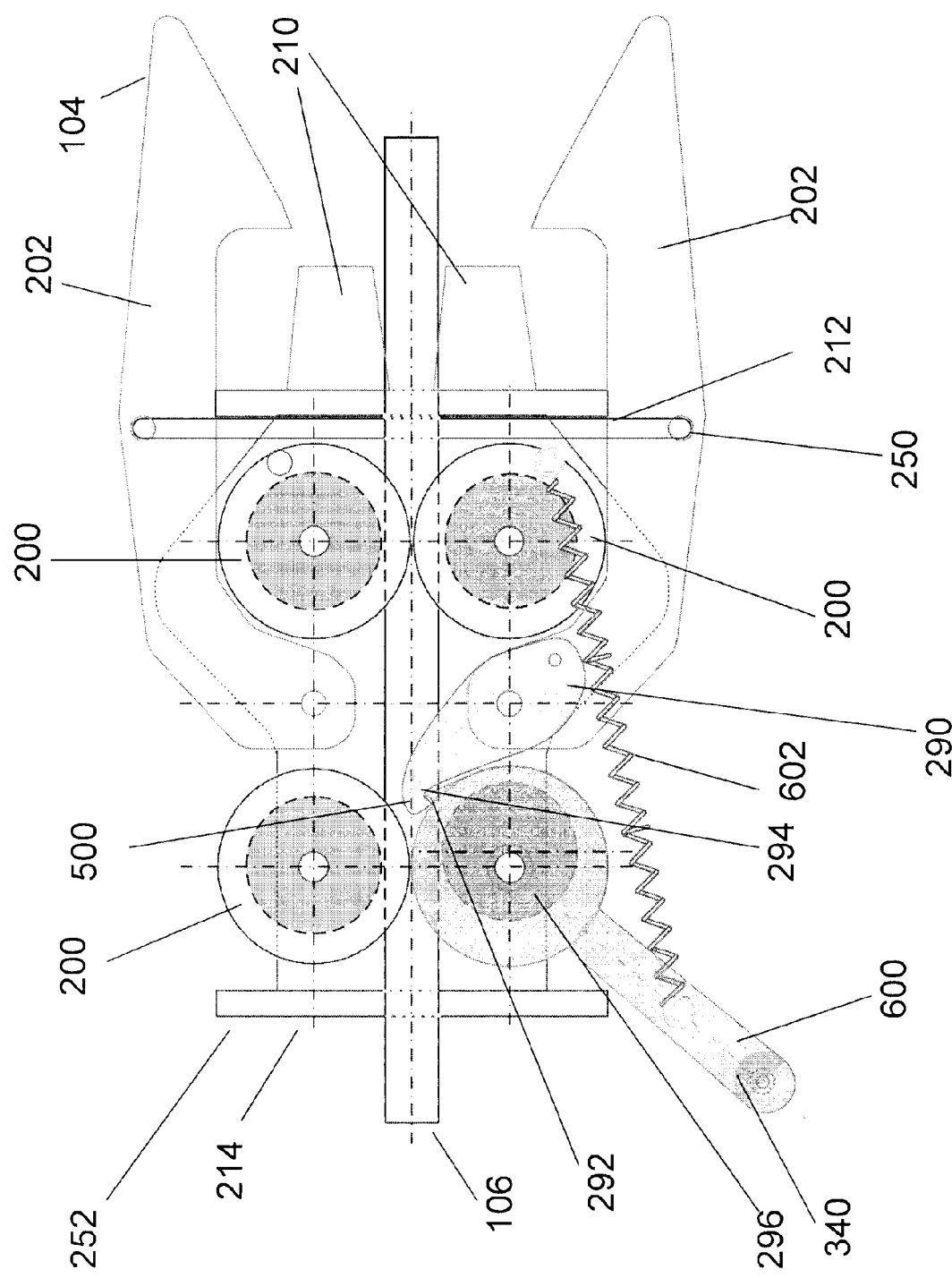
FIG. 6A is a top view illustrating the primary stopping member of the zipline braking system of FIG. 1 and FIG. 2 according to an embodiment of the invention.

FIG. 6A is a top view illustrating the primary stopping member 104 of the zipline braking system 100 of FIG. 1 and FIG. 2 according to an embodiment of the invention. According to an embodiment of the invention, the primary stopping member 104 further comprises a braking roller 600 that comprises an engaging member 292, a roller arm 340, and a brake eccenter 296. The braking roller 600 is connected to an elastic member 602 which is connected to the top plate 204. The primary stopping member 104 further comprises a claw 290 having a hook 294 adapted to operatively engage the engaging member 292 and connected to one of the gripping claws 202 of the primary stopping member 104. In the engaged position 500, the hook 294 engages the engaging member 292 such that the brake eccenter 296 does not press against the zipline cable 106 and allows the primary stopping member 106 to move freely along the zipline cable 106.

Figure 6B:
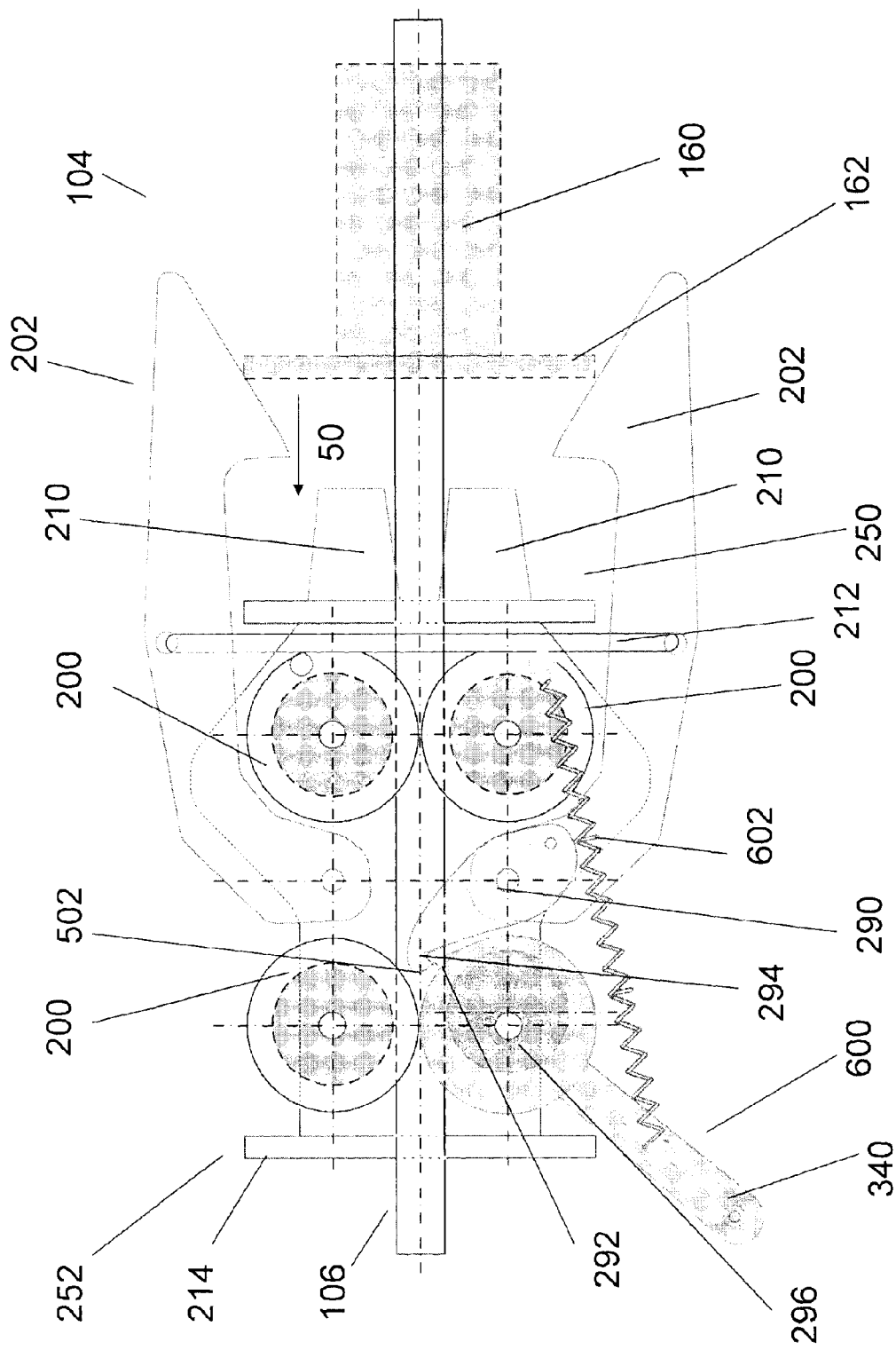
FIG. 6B is a top view illustrating the primary stopping member engaging the rider carrier of the zipline braking system of FIG. 1 and FIG. 2 according to an embodiment of the invention.

FIG. 6B is a top view illustrating the primary stopping member 104 engaging the rider carrier 160 of the zipline braking system 100 of FIG. 1 and FIG. 2 according to an embodiment of the invention. In this embodiment, the rider carrier 160 further comprises protrusions 162 adapted to engage the gripping claws 202 of the primary stopping member 104. As the rider carrier 160 moves in a direction 50 towards the destination supporting member 130, it engages gripping claws 202 and pushes the gripping claws 202 to open. The opening of the gripping claws 202 to engage the protrusions 162 also causes the claw 290 to move and the hook 294 to disengage the engagement member 292 and to move from the engaged position 500 to a disengaged position 502.

FIG. 6C is a top view illustrating the primary stopping member 104 of the zipline braking system 100 of FIG. 1 and FIG. 2 in the braking position after engagement with the rider carrier 160 according to an embodiment of the invention. The rider carrier 160 pushes against the bumpers 210 and the protrusions 162 of the rider carrier 160 engages the gripping claws 202. After the claw 290 is moved to the disengaged position 502, the elastic member 602 pulls the braking roller 600 in a direction 60 towards the posterior plate 212 and causes the brake eccenter 296 to rotate such that it frictionally engages the zipline cable 106. Therefore, as the primary stopping member 104 is pushed by the rider carrier 160 towards the destination supporting member 130, the brake eccenter 296, by pushing against the zipline cable 106, creates friction that causes a decelerating force to be exerted on the primary stopping member 104 and, as a result, the rider carrier 160, in a direction 20 away from the destination supporting member 130.

Figure 6D:
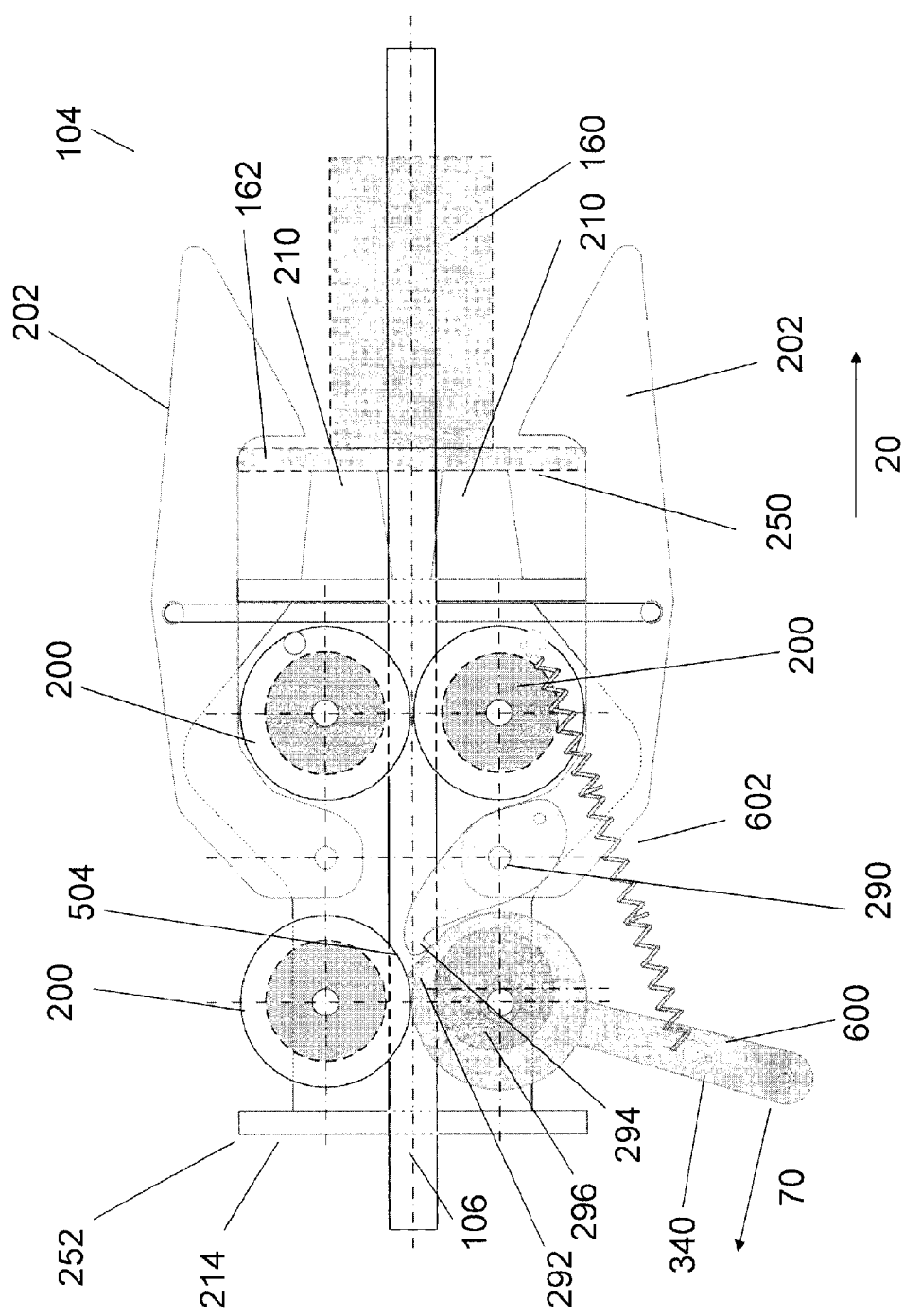
FIG. 6D is a top view illustrating the primary stopping member of the zipline braking system of FIG. 1 and FIG. 2 after completing its engagement with the rider carrier according to an embodiment of the invention.

FIG. 6D is a top view illustrating the primary stopping member 104 of the zipline braking system 100 of FIG. 1 and FIG. 2 after completing its engagement with the rider carrier 160 according to an embodiment of the invention. The rider carrier 160 is pushed against the bumpers 210 and held in place by the gripping claws 202. The claw 290 rests on the braking roller 600 in a braking position 504 and the brake eccenter 296 pushing against the zipline cable 106. By asserting a force in the direction 70 on the roller arm 340 of the braking roller 600 after the rider carrier 160 has been removed from engagement with the primary stopping member 104, the engaging member 292 and the hook 294 can be changed from the braking position 504 to the engaged position 500. In one embodiment, the elastic member 602 is a spring.

Figure 7:
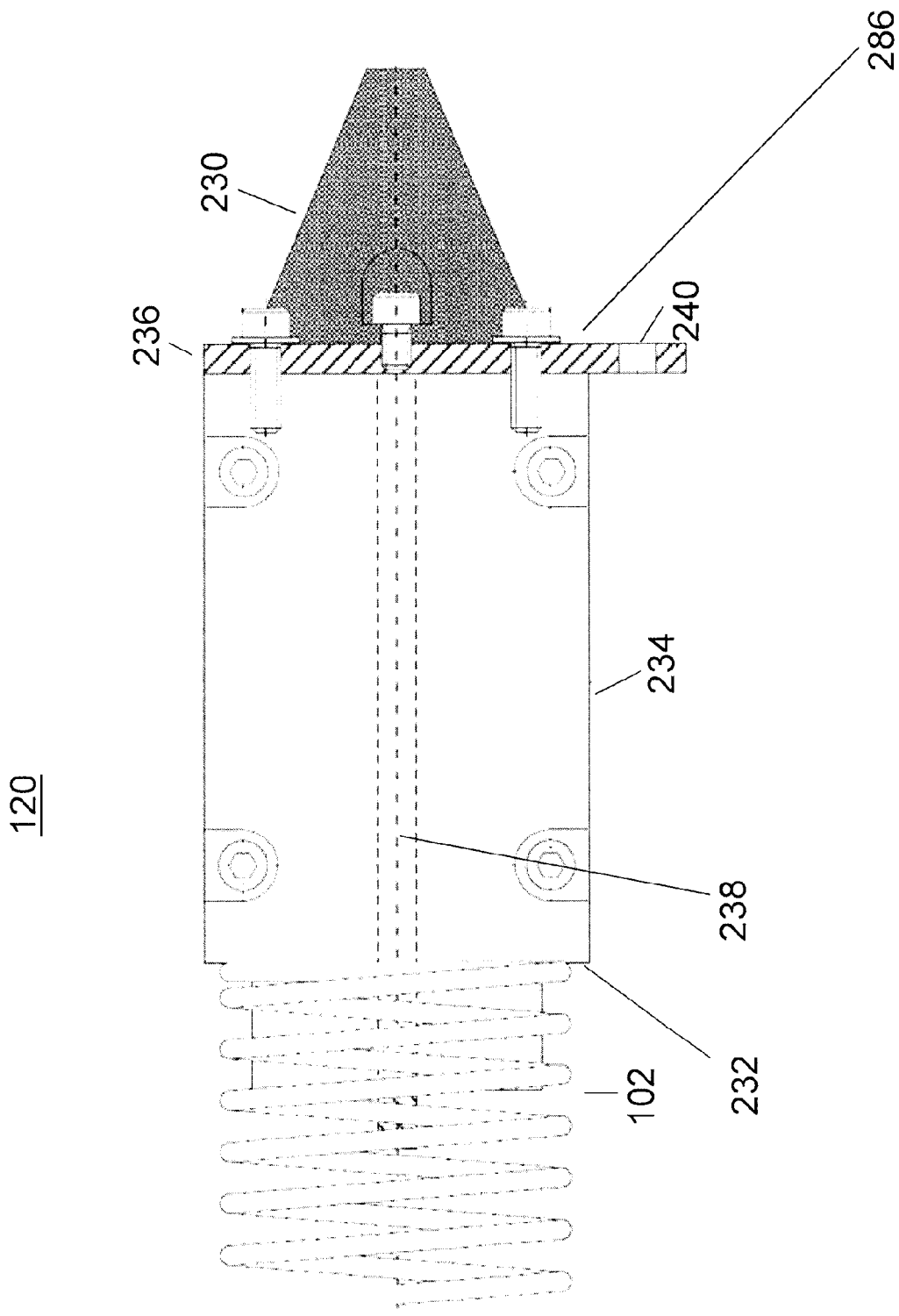
FIG. 7 is a side view illustrating the secondary stopping member of the zipline braking system of FIG. 1 and FIG. 2 according to an embodiment of the invention.
Figure 8:
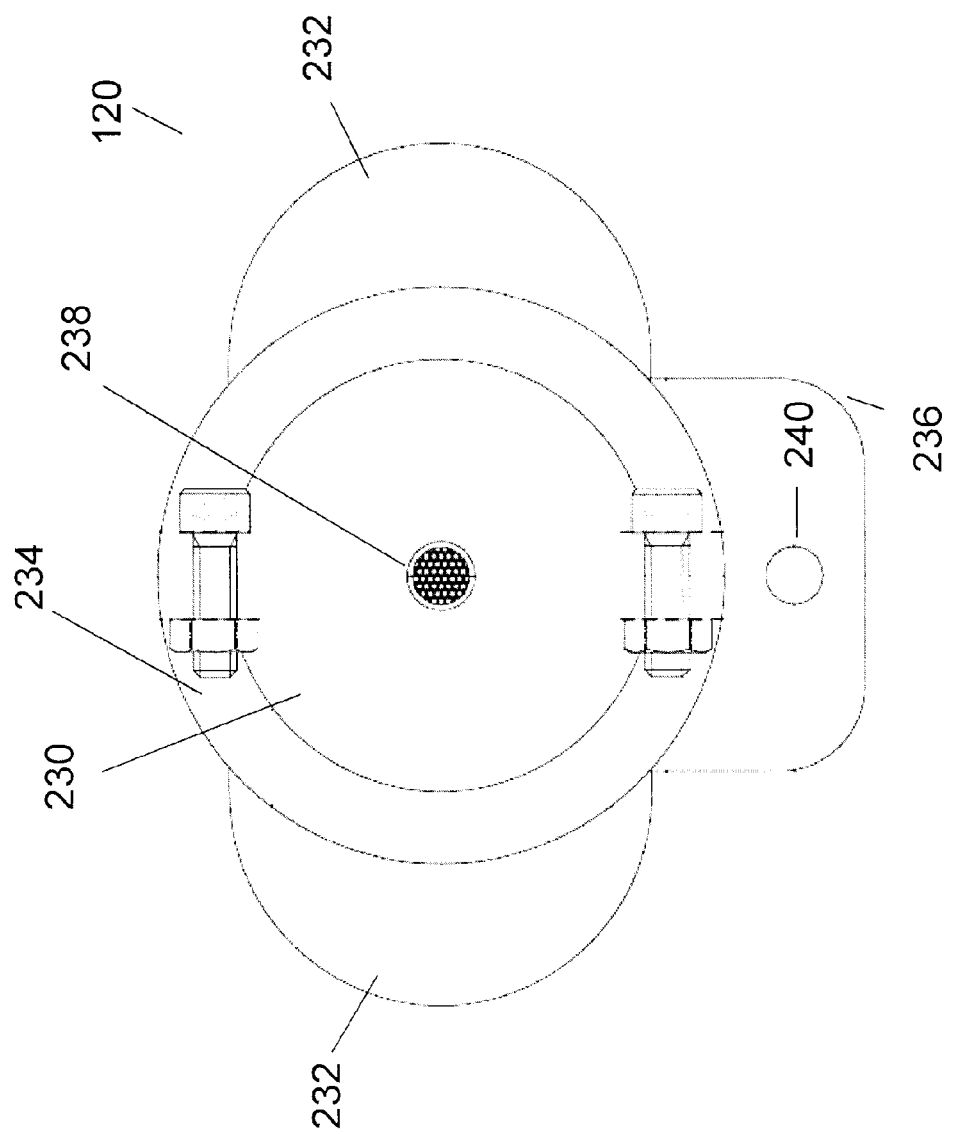
FIG. 8 is a front view illustrating the secondary stopping member of the zipline braking system of FIG. 1 and FIG. 2 according to an embodiment of the invention.

FIG. 7 is a side view illustrating the secondary stopping member 120 of the zipline braking system 100 of FIG. 1 and FIG. 2 according to an embodiment of the invention. FIG. 8 is a front view illustrating the secondary stopping member 120 of the zipline braking system 100 of FIG. 1 and FIG. 2 according to an embodiment of the invention. The secondary stopping member 120 includes a receiving module 230, a cable cavity 238 for mounting on the zipline cable 106, a socket 232 for engaging the damper 102, and a sliding block 234 for travelling on the zipline cable 106. According to other embodiments, the secondary stopping member 120 further includes an end plate 236 at its posterior end 286. The secondary stopping member 120 may be made of a light weight material. The sliding block 234 and the end plate 236 may be made of nylon, carbon fibre, aluminum, plastic, steel, other materials known to a person skilled in the art, or a combination thereof. According to one embodiment, the receiving module 230 is made of rubber. Other shock absorbing materials may also be used for the receiving module 230. The receiving module 230 may be pointed or may be adapted to other shapes to engage the primary stopping member 104.

According to other embodiments, the secondary stopping member 120 may further include a hole 240 formed in the end plate 236 for connection to the arrester line 152 or the tension line 140. As illustrated in FIG. 1 and FIG. 2, according to some embodiments, the arrester line 152 is connected to the arrester ballast 150 and led around an arrester foot block 156 and through the arrester clutch 154. The arrester ballast 150 is used to prevent the rider carrier 160 from being pushed back by the damper 102 upon contact of the secondary stopping member 120 with the damper 102 and the rider leaving the rider carrier 160.

According to one embodiment as illustrated in FIG. 1 and FIG. 2, the primary stopping member 104 engages the secondary stopping member 120. In addition to the compression of the damper 102 caused by tension created in the tension lines 140 by movement of the primary stopping member 104, engagement of the primary stopping member 104 with the secondary stopping member 120 leads to a decelerating force being exerted on the primary stopping member 104 and the rider carrier 160 in a direction 20 away from the destination supporting member 130. Persons skilled in the art may appreciate that the geometric arrangement of the primary stopping member 104, the base foot block 110, and the secondary stopping member 120 gives rise to various decelerating forces as a function of the velocity of the rider carrier 160 and the displacement of the primary stopping member 104, secondary stopping member 120 and the damper 102 upon engagement of the primary stopping member 104 by the rider carrier 160.

As will be understood by those skilled in the art of zipline operation and construction, different types of cables can be used for the tension line 140 and the zipline cable 106. According to one embodiment, the tension line 140 may be a non-stretchable high quality marine rope or be a polyester double braid rope. According to another embodiment, the tension line 140 may be made of Dyneema®. According to further embodiments, water-repellent cables that are highly durable and suffer little degradation from sun light may be used for the tension line 140. According to one embodiment, the tension line 140 may be made of ⅜ inch marine grade yacht line rated for loads that are greater than 3,000 pounds in weight. In still other embodiments, an AmSteel®-Blue cable, which is a torque-free 12-strand single braid cable, may be used for the zipline cable 106. According to another embodiment, the zipline cable 106 may be a ⅞ inch steel cable.

As will be appreciated by those skilled in the art, different materials and apparatus that absorb kinetic energy may be used for damper 102. According to one embodiment, the damper 102 is a uniform compression spring coil. According to other embodiments, the damper 102 may be a progressive spring coil, a viscous damper, a fiction damper, or a magnetic brake with modifications as may be appreciated by the persons skilled in the art. According to one embodiment, the damper 102 includes springs having a spring constant ranging from 5 to 20 kN/m.

Turning blocks that are known to persons skilled in the art can be used for the base foot block 110, the front foot block 112, the side stand-up block 142, and the arrester foot block 156. According to one embodiment, the turning blocks may be marine grade turning blocks. According to another embodiment, the turning blocks may be marine grade blocks rated for loads that are 3,000 pounds in weight.

The origination supporting member 108 and the destination supporting member 130 may be constructed using different materials, including, without limitation, wood, metal, or any material suitable for building structures. The origination supporting member 108 and the destination supporting member 130 have areas, such as platforms, that allow for launching riders down a zipline cable 106 and for landing riders from the rider carrier 160.

Figure 9:
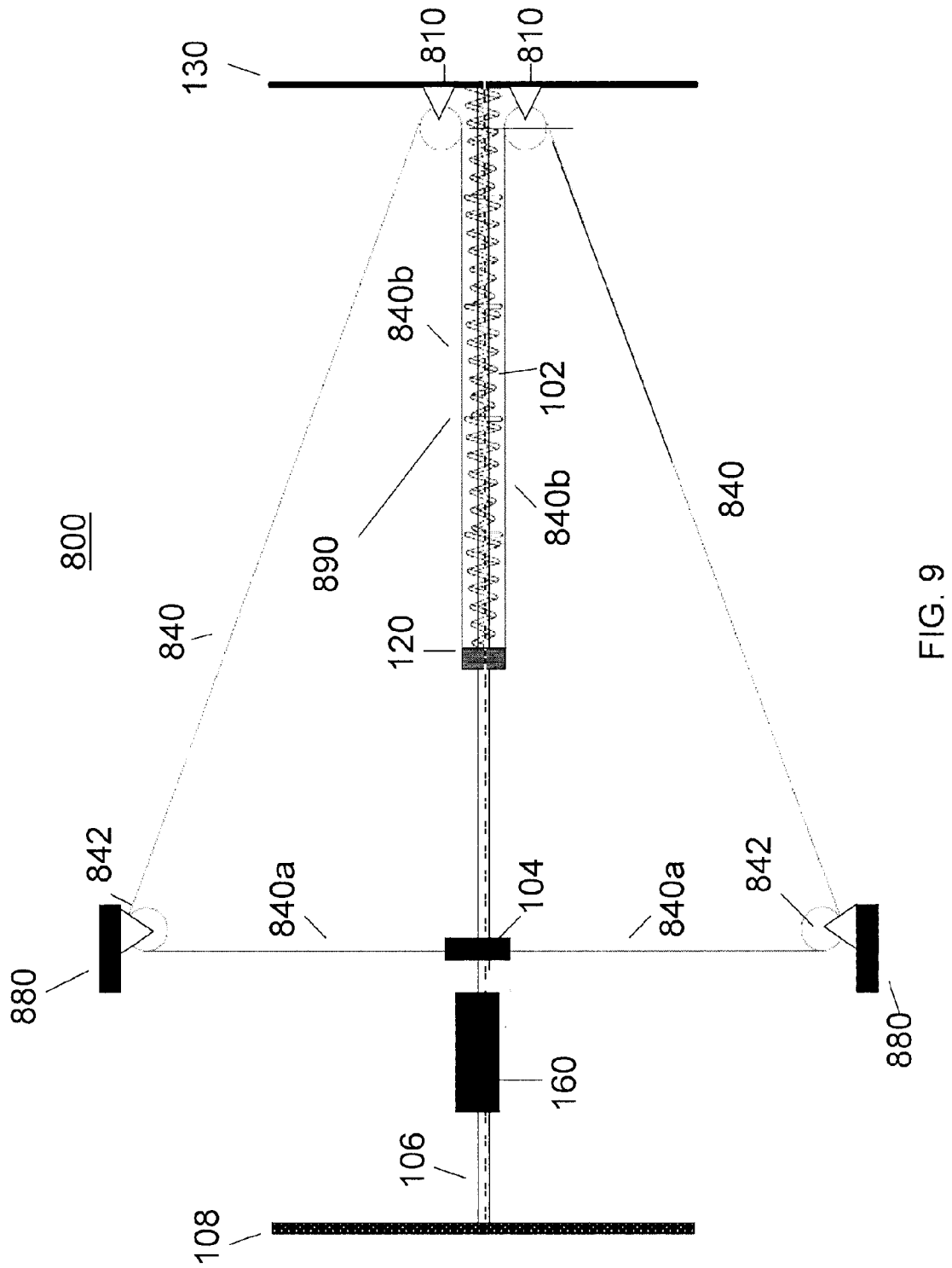
FIG. 9 is a top view illustrating a zipline braking system in an uncompressed configuration according to another embodiment of the invention.

FIG. 9 is a top view illustrating a zipline braking system 800 in an uncompressed configuration 890 according to another embodiment of the invention. In this embodiment, two tension lines 840 are used and they are each connected to the primary stopping member 104. Each of the tension lines 840 is led around a side stand-up block 842 and a base foot block 810 connected to the destination supporting member 130, such blocks 810 located on either side of the zipline cable 106. The side stand-up blocks 842 may be connected to side supporting members 880. Each of the tension lines 840 are connected to the secondary stopping member 120.

Figure 10:
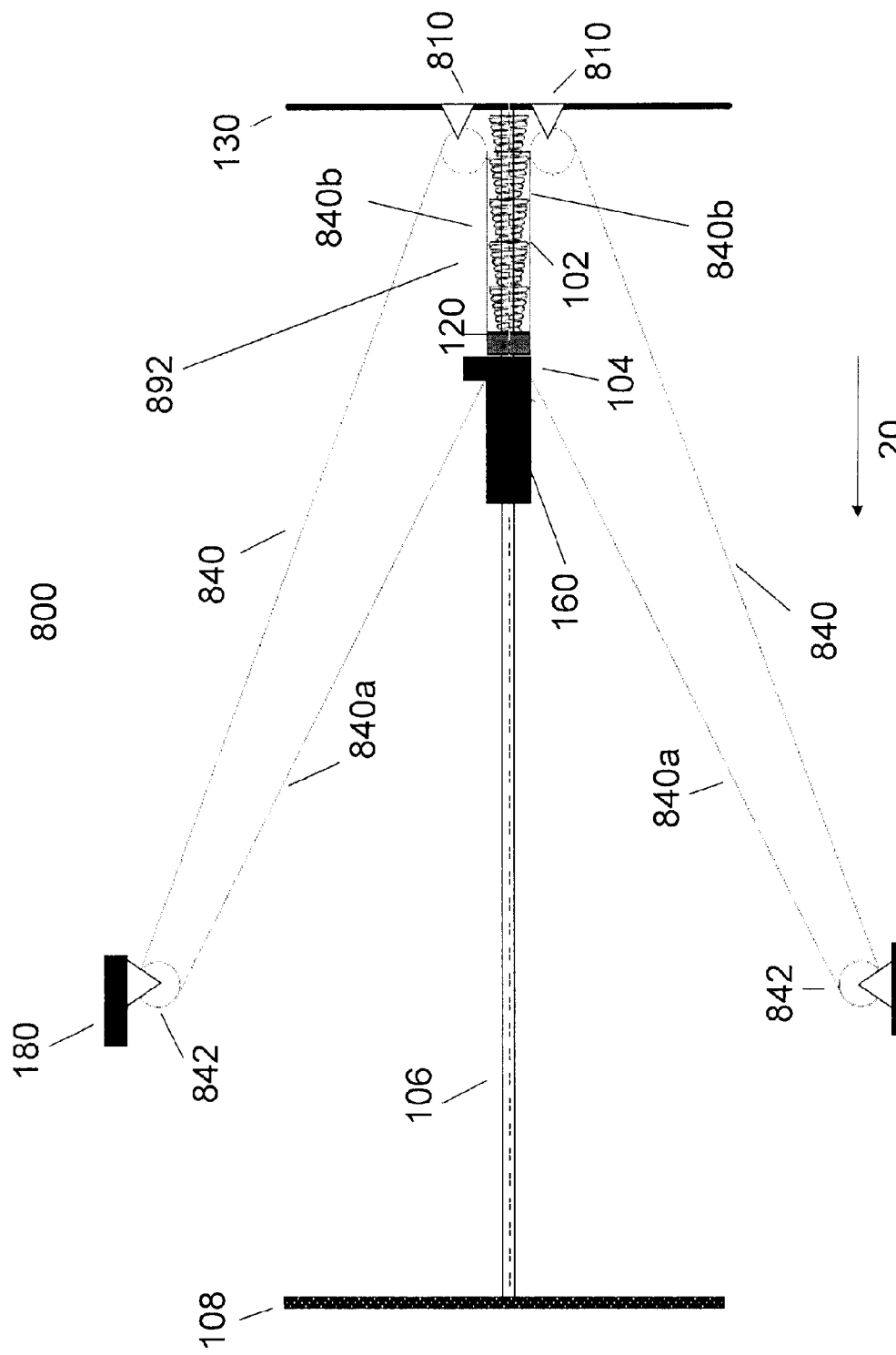
FIG. 10 is a top view illustrating the zipline braking system of FIG. 9 in a compressed configuration according to another embodiment of the invention.

FIG. 10 is a top view illustrating the zipline braking system 800 of FIG. 9 in a compressed configuration 892 according to another embodiment of the invention. Movement of the primary stopping member 104 towards the destination supporting member 130 (after engagement with the rider carrier 160 moving in the same direction) along the zipline cable 106 creates tension in the tension lines 840, leading to compression of the damper 102 by reduction in the lengths of segments 840b of the tension lines 840. The compression of the damper 102 and movement of the primary stopping member 104 result in an increase in lengths of segments 840a of the tension lines 840 between the side stand-up block 842 and the primary stopping member 104 relative to the uncompressed configuration 890 of the braking system 800. A deceleration force in a direction 20 away from the destination supporting member 130 reduces the speed of the primary stopping member 104 upon engagement of the primary stopping member 104 with the secondary stopping member 120. Movement of the secondary stopping member 120 towards the destination supporting member 130 as a result of the movement of the tension lines 840 compresses the damper 102. The damper 102 is further compressed upon engagement of the primary stopping member 104 with the secondary stopping member 120.

Figure 11:
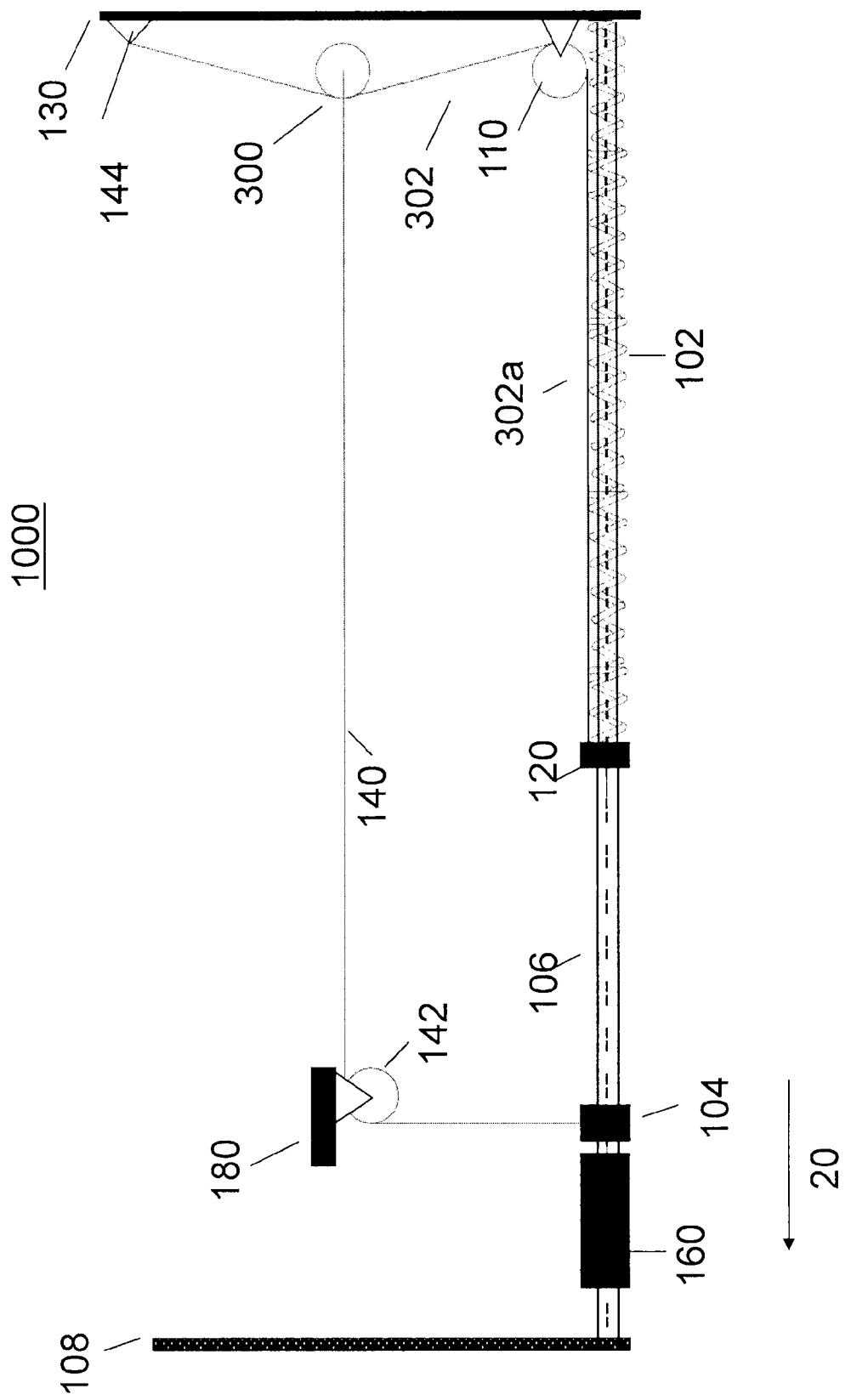
FIG. 11 is a top view illustrating a zipline braking system in an uncompressed configuration according to another embodiment of the invention.

FIG. 11 is a top view illustrating a zipline braking system 1000 in an uncompressed configuration according to another embodiment of the invention. In this further embodiment, the tension line 140 is connected to the primary stopping member 104 and an end block 300 connected to the destination supporting member 130, and the tension line 140 is led around the side stand-up block 142. A compression line 302 is connected to the destination supporting member 130 through a securing member 144 and led around the end block 300, the base foot block 110, and connected to the secondary stopping member 120. The end block 300 is movable such that it can move in a direction away from the destination supporting member 130 upon movement of the rider carrier 160 towards the destination supporting member 130 and engagement with the primary stopping member 104 (such engagement also causing a decelerating force to be exerted on the rider carrier 160 in a direction 20 away from the destination supporting member 130). The movement of the primary stopping member 104 creates tension in the tension line 140, and the tension in the tension line 140 causes the end block 300 to move away from the destination supporting member 130. This movement creates tension in the compression line 302 and leads to a decrease in length of a segment 302a of the compression line 302 between the secondary stopping member 120 and the base foot block 110 and compression of the damper 102. Movement of the secondary stopping member 120 as a result of such reduction in the length of the segment 302a of the compression line 302 further compresses the damper 102, as the braking system 1000 switches from the uncompressed configuration to a compressed configuration with the damper 102 compressed. The damper 102 is further compressed upon engagement of the primary stopping member 104 with the secondary stopping member 120.

Figure 12:
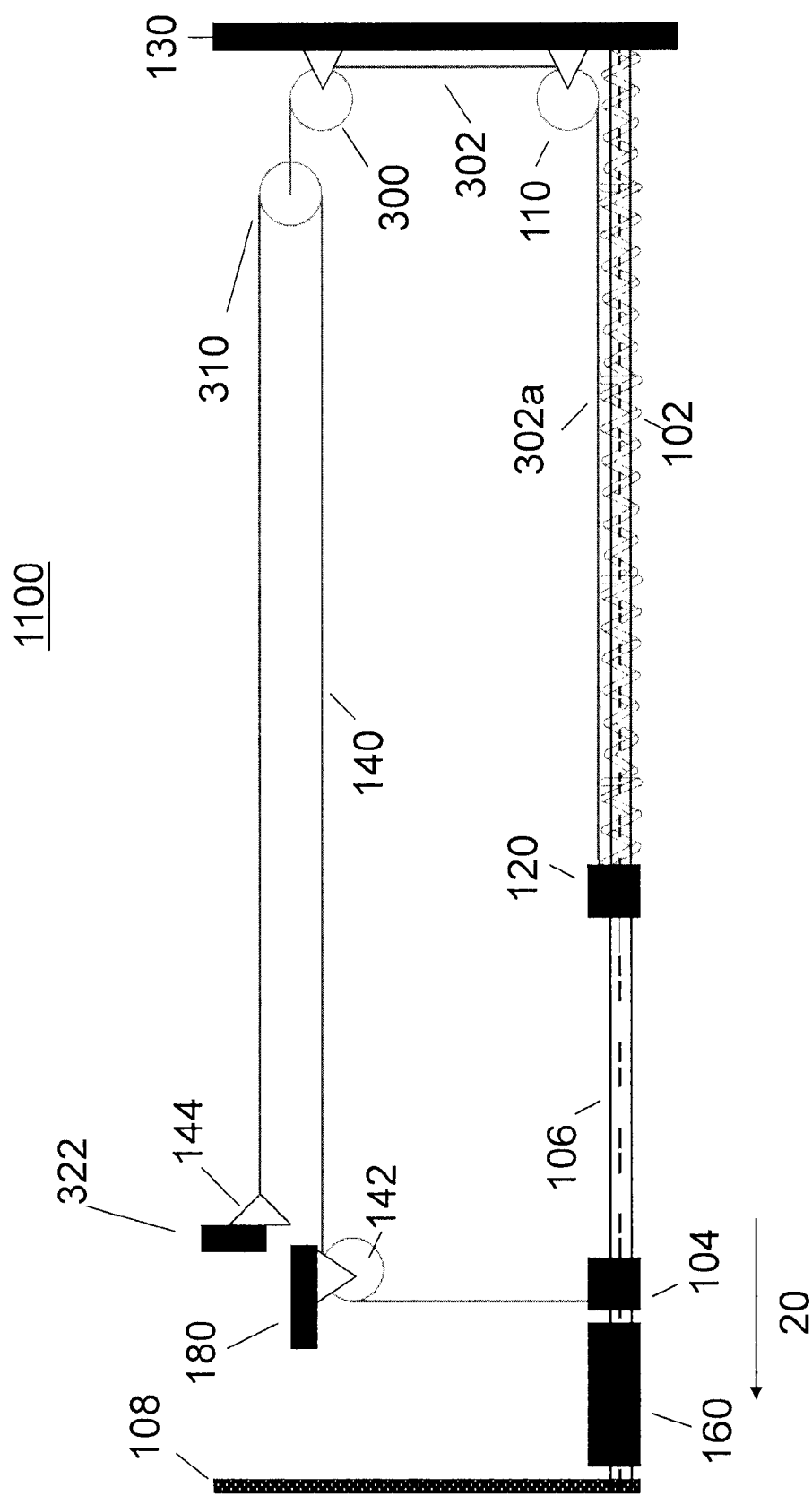
FIG. 12 is a top view illustrating a zipline braking system in an uncompressed configuration according to another embodiment of the invention.

FIG. 12 is a top view illustrating a zipline braking system 1100 in an uncompressed configuration according to another embodiment of the invention. In this embodiment, the tension line 140 is connected to the primary stopping member 104 and led around the side stand up block 142 and a second side stand up block 310 and connected to a securing member 144 on a second side supporting member 322. The second side stand-up block 310 is attached to the destination supporting member 130 and is movable away from the destination supporting member 130 when pulled by the tension line 140. The compression line 302 is connected to the second side stand-up block 310 and the secondary stopping member 120 and is led around the base foot block 110 and the end block 300. Upon engagement of the primary stopping member 104 by the rider carrier 160 in movement towards the destination supporting member 130 along the zipline cable 106, the rider carrier 160 causes the primary stopping member 104 to move towards the destination supporting member 130 (such engagement also causing a decelerating force to be exerted on the rider carrier 160 in a direction 20 away from the destination supporting member 130, as described below). The movement of the primary stopping member 104 creates tension in the tension line 140, and the tension in the tension line 140 causes the second side stand-up block 310 to move away from the destination supporting member 130. Such movement of the second side stand-up block 310 creates tension in the compression line 302 and leads to a decrease in length of the segment 302a of the compression line between secondary stopping member 120 and the base foot block 110 and compression of the damper 102. Movement of the secondary stopping member 120 as a result of such reduction in the length of the segment 302a of the compression line 302 further compresses the damper 102, as the braking system 1100 switches from an uncompressed configuration to a compressed configuration with the damper 102 compressed. The damper 102 is further compressed upon engagement of the primary stopping member 104 with the secondary stopping member 120.

Figure 13:
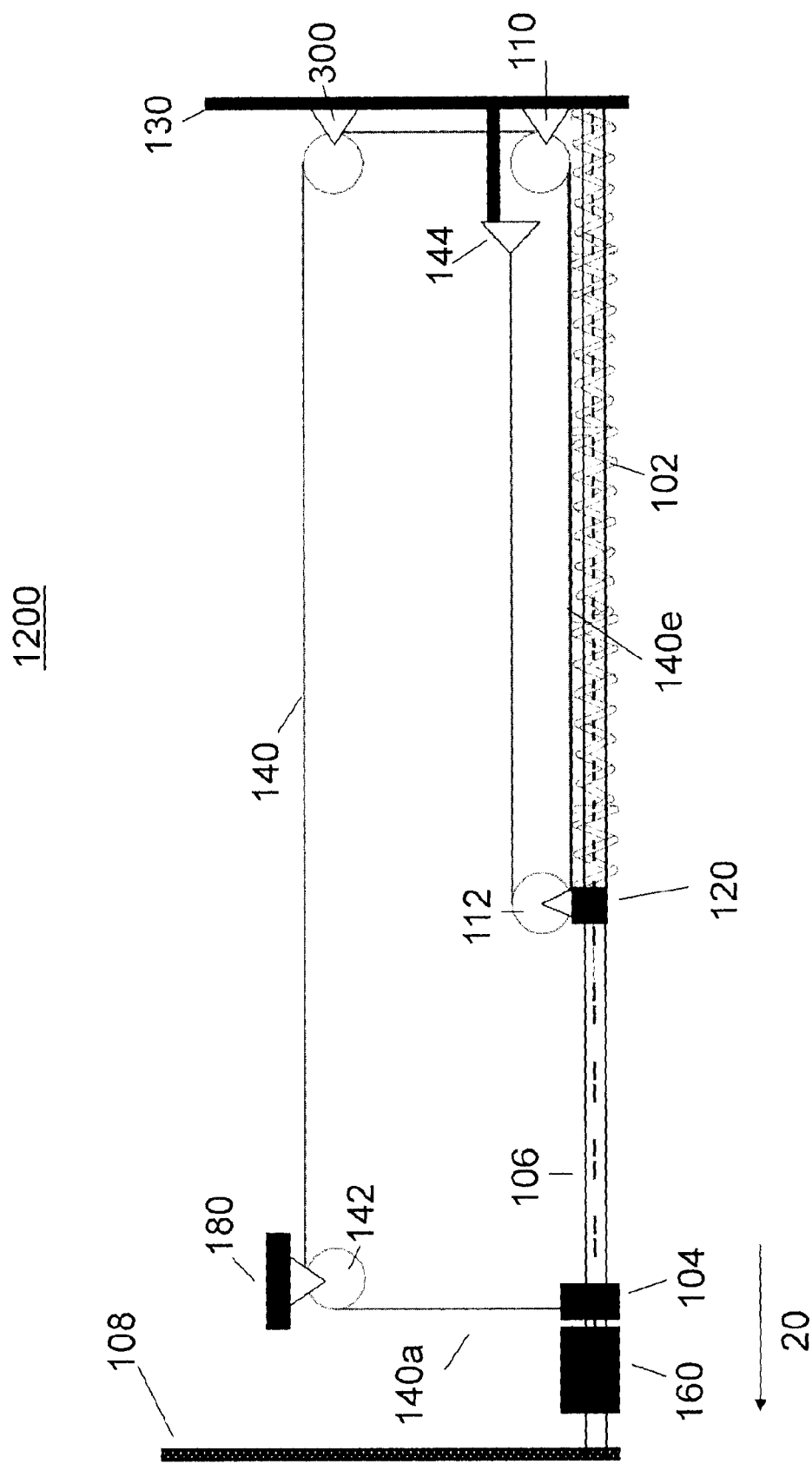
FIG. 13 is a top view illustrating a zipline braking system in an uncompressed configuration according to another embodiment of the invention.

FIG. 13 is a top view illustrating a zipline braking system 1200 in an uncompressed configuration according to another embodiment of the invention. In this embodiment, the tension line 140 is connected to the primary stopping member 104 and led around the side stand-up block 142, the end block 300, the base foot block 110, the front foot block 112 connected to the secondary stopping member 120, and is connected to a securing member 144 on the destination supporting member 130 between the base foot block 110 and end block 300. Upon engagement of the primary stopping member 104 by the rider carrier 160 in movement towards the destination supporting member 130 along the zipline cable 106 (such engagement also causing a decelerating force to be exerted on the rider carrier 160 in a direction away 20 from the destination supporting member 130), tension is created in the tension line 140, which causes a reduction in the length of the segment 140e of the tension line 140 that is between front foot block 112 and base foot block 110. This reduction results in the compression of the damper 102 due to movement of the secondary stopping member 120 towards the destination supporting member 130 and an increase in length of the segment 140a of the tension line 140 between the primary stopping member 104 and the side stand-up block 142. The braking system 1300 switches from an uncompressed configuration to a compressed configuration with the damper 102 compressed. The damper 102 is further compressed upon the primary stopping member 104 engaging the secondary stopping member 120.

Figure 14:
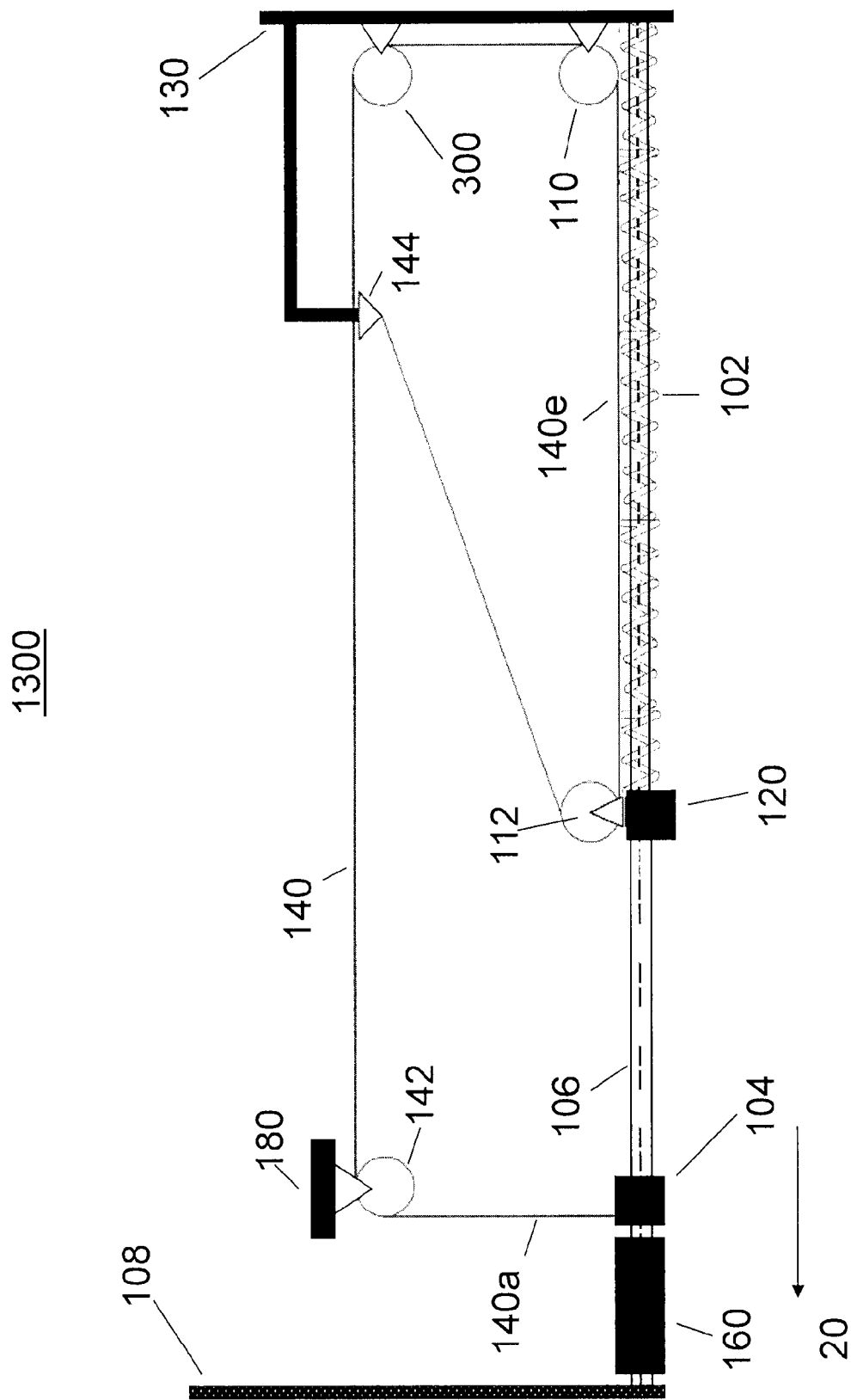
FIG. 14 is a top view illustrating a zipline braking system in an uncompressed configuration according to another embodiment of the invention.

FIG. 14 is a top view illustrating a zipline braking system 1300 in an uncompressed configuration according to another embodiment of the invention. In this embodiment, the tension line 140 is connected to the primary stopping member 104 and led around the side stand-up block 142, the end block 300, the base foot block 110, the front foot block 112 connected to the secondary stopping member 120, and is connected to a securing member 144 located between the end block 300 and the side stand-up block 142. Upon engagement of the primary stopping member 104 by the rider carrier 160 in movement towards the destination supporting member 130 along the zipline cable 106 (such engagement also causing a decelerating force to be exerted on the rider carrier 160 in a direction 20 away from the destination supporting member 130), tension is created in the tension line 140, which causes a reduction in the length of the segment 140e of the tension line 140 that is between the front foot block 112 and the base foot block 110. These results in the compression of the damper 102 due to movement of the secondary stopping member 120 towards the destination supporting member 130 and an increase in length of the segment 140a of the tension line 140 between the primary stopping member 104 and the side stand-up block 142. The braking system 1300 switches from an uncompressed configuration to a compressed configuration with the damper 102 compressed. The damper 102 is further compressed upon the primary stopping member 104 engaging the secondary stopping member 120.

Figure 15:
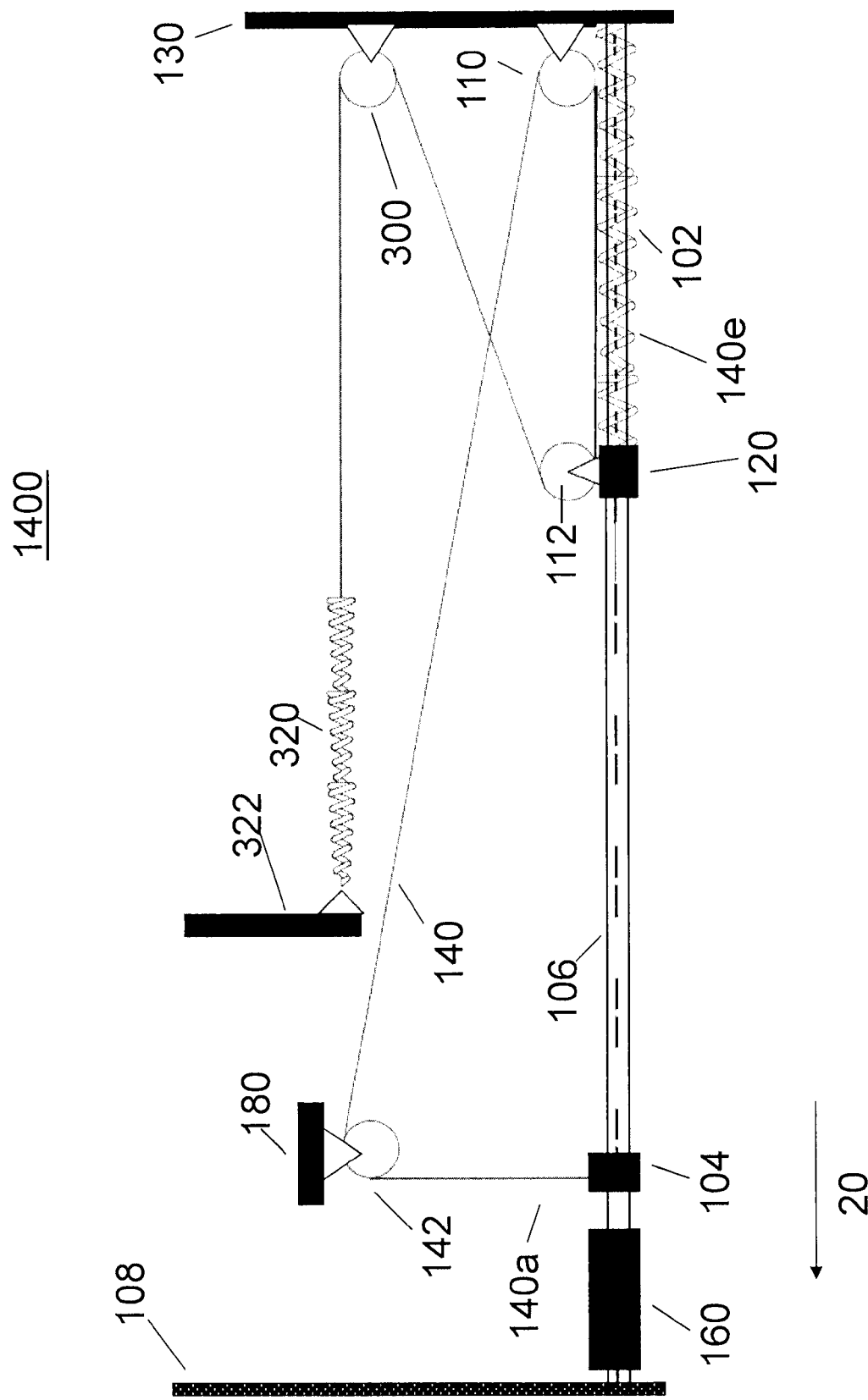
FIG. 15 is a top view illustrating a zipline braking system in an uncompressed configuration according to another embodiment of the invention.

FIG. 15 is a top view illustrating a zipline braking system 1400 in an uncompressed configuration according to another embodiment of the invention. In this embodiment, the tension line 140 is connected to the primary stopping member 104 and led around the side stand-up block 142, the base foot block 110, the front foot block 112 connected to the secondary stopping member 120, the end block 300, and connected to a set of springs 320 that is connected to a second side supporting member 322. Upon engagement of the primary stopping member 104 by the rider carrier 160 in movement towards the destination supporting member 130 along the zipline cable 106 (such engagement also causing a decelerating force to be exerted on the rider carrier 160 in a direction 20 away from the destination supporting member 130), tension is created in the tension line 140, which causes a reduction in the length of the segment 140e of the tension line 140 that is between front foot block 112 and base foot block 110. This reduction results in the compression of the damper 102 due to movement of the secondary stopping member 120 towards the destination supporting member 130 and an increase in length of the segment 140a of the tension line 140 between the primary stopping member 104 and the side stand-up block 142. The braking system 1300 switches from an uncompressed configuration to a compressed configuration with the damper 102 compressed. The damper 102 is further compressed upon the primary stopping member 104 engaging the secondary stopping member 120. 02. The movement of the tension line 140 is further mediated by the set of springs 320 acting on the tension line 140. The damper 102 may be loaded in a 2:1 ratio with the springs 320 being loaded 1:1, and this structure may provide flexibility in fine tuning of the zipline braking system 1400.

Figure 16:
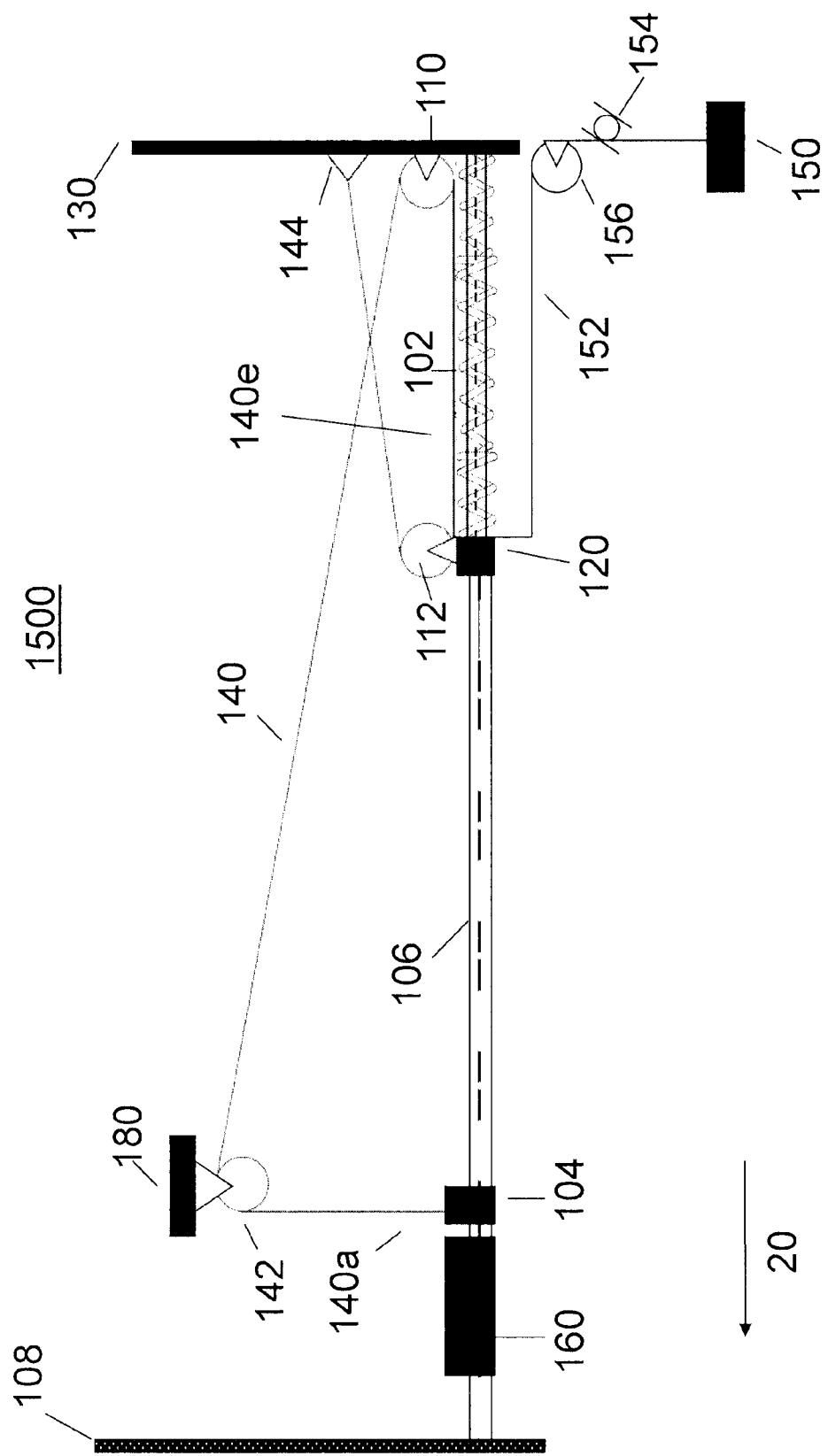
FIG. 16 is side view illustrating a zipline braking system in an uncompressed configuration according to another embodiment of the invention.

FIG. 16 is a side view illustrating a zipline braking system 1500 in an uncompressed configuration according to another embodiment of the invention. In this embodiment, the tension line 140 is connected to the primary stopping member 104 and to a securing member 144 connected to the destination supporting member 130 and is led around the side stand-up block 142, the base foot block 110, and the front foot block 112 connected to the secondary stopping member 120. The secondary stopping member 120 is connected to the arrester cable 152 which is led around an arrester foot block 156 and connected to an arrester ballast 150 through an arrester clutch 154. Upon engagement of the primary stopping member 104 by rider carrier 160 in movement towards the destination supporting member 130 along the zipline cable 106 (such engagement also causing a decelerating force to be exerted on the rider carrier 160 in a direction 20 away from the destination supporting member 130), tension is created in the tension line 140, which causes a reduction in the length of the segment 140e of the tension line 140 that is between front foot block 112 and base foot block 110. This reduction results in the compression of the damper 102 due to movement of the secondary stopping member 120 towards the destination supporting member 130 and an increase in length of the segment 140a of the tension line 140 between the primary stopping member 104 and the side stand-up block 142. The braking system 1500 switches from an uncompressed configuration to a compressed configuration with the damper 102 compressed. The damper 102 is further compressed upon the primary stopping member 104 engaging the secondary stopping member 120. Movement of the secondary stopping member 120 is further mediated by the weight of the arrester ballast 150. The arrester line 152 and the arrester ballast 150 may be adapted for use with different embodiments of the present invention.

Figure 17:
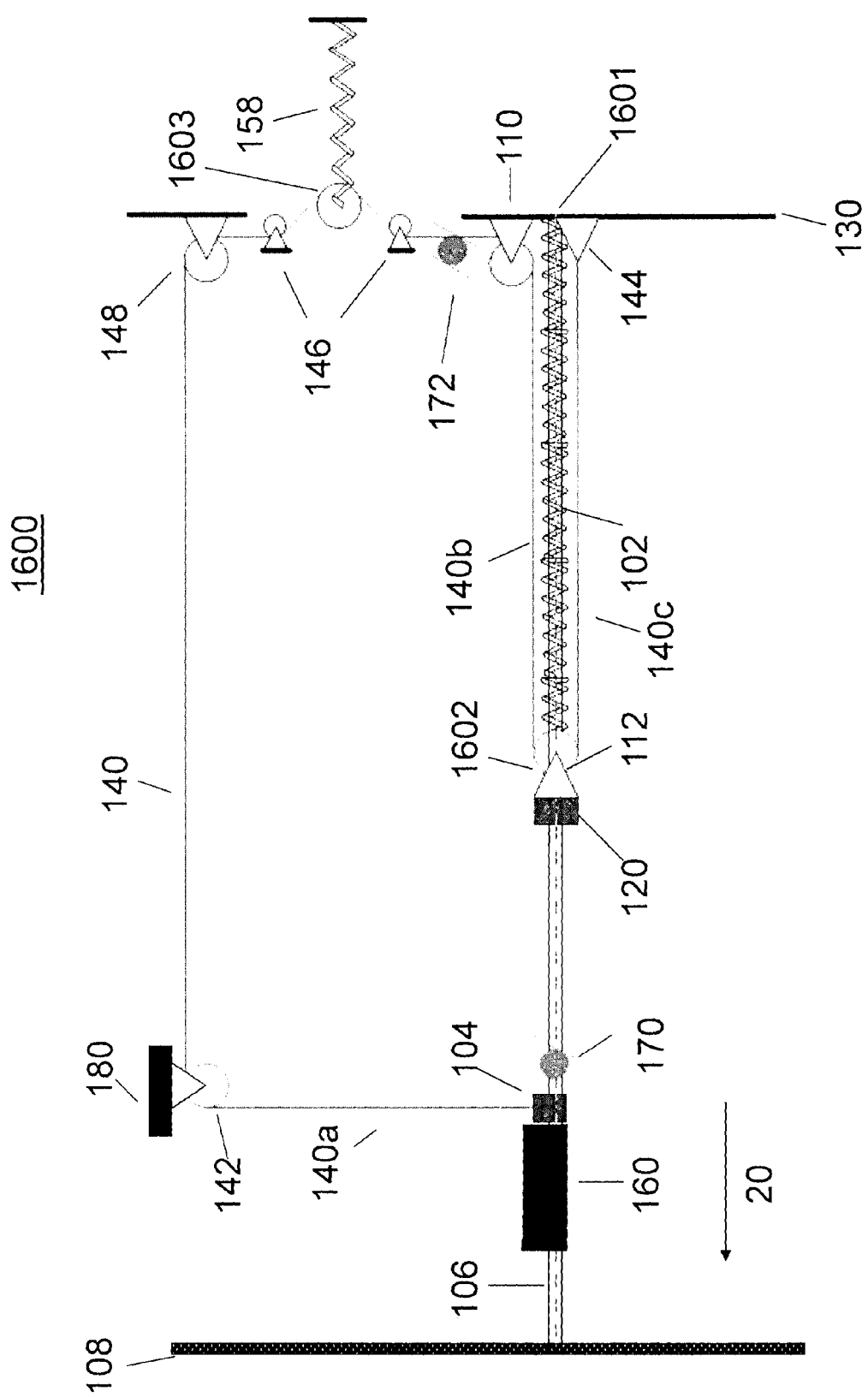
FIG. 17 is a top view illustrating a zipline braking system in an uncompressed configuration according to another embodiment of the invention.

FIG. 17 is a top view illustrating a zipline braking system 1600 in an uncompressed configuration according to another embodiment of the invention. In this embodiment, the zipline braking system 1600 includes a destination supporting member 130 connected to a zipline cable 106, a damper 102 connected to the destination supporting member 130, a base foot block 110 at the posterior end 1601 of the damper 102, a front foot block 112 attached to the secondary stopping member 120 and located at the anterior end 1602 of the damper 102, a secondary stopping member 120 mounted on the zipline cable 106, a primary stopping member 104 connected to a tension line 140, the tension line 140 being led around the side stand-up block 142, a second stand-up block 148 connected to the destination supporting member 130, small blocks 146, a block 1603 mounted on an anti-slack bungee 158, the base foot block 110, and front foot block 112, and connected to the securing member 144. In this embodiment, the tension line 140 is led through a clutch 172.

Upon the rider carrier 160 engaging the primary stopping member 104 when moving towards the destination supporting member 130 (such engagement also causing a decelerating force to be exerted on the rider carrier 160 in a direction 20 away from the destination supporting member 130), tension is created in the tension line 140, which causes a reduction in the length of segments 140b and 140c of the tension line 140 that is between front foot block 112 and base foot block 110. This reduction results in the compression of the damper 102 due to movement of the secondary stopping member 120 towards the destination supporting member 130 and an increase in length of the segment 140a of the tension line 140 between the primary stopping member 104 and the side stand-up block 142. The braking system 1600 switches from an uncompressed configuration to a compressed configuration with the damper 102 compressed. The damper 102 is further compressed upon the primary stopping member 104 engaging the secondary stopping member 120. The anti-slack bungee 158 may assist with retaining tension in the tension line 140 during operation of the braking system 1600. According to one embodiment, the anti-slack bungee 158 is a nylon protected rubber bungee with a diameter of ½ inch.

The above embodiments may contribute to an improved zipline braking system 100 and may provide one or more advantages. First, the zipline braking system 100 may utilize common components such as blocks and cables that are known by and accessible to those skilled in the art. Secondly, the zipline braking system 100 may provide a gentler deceleration of the zipline rider. Thirdly, the zipline braking system 100 may allow off-the-shelf parts to be used so as to decrease the costs of implementing the zipline braking system 100 in comparison to systems requiring use of custom parts. Fourthly, the zipline braking system 100 may be adopted for use with various types of ziplines.

The embodiments of the invention described above are intended to be exemplary only. Those skilled in this art will understand that various modifications of detail may be made to these embodiments, all of which come within the scope of the invention.

What is claimed is:

1. A zipline braking system comprising: a zipline cable and a destination supporting member;
   a rider carrier coupled to the zipline cable for movement towards the destination supporting member, such movement generating kinetic energy;
   a damper connected to the destination supporting member; a tension line;
   a stopping member coupled to the zipline cable and the tension line; and the tension line interconnecting the stopping member and the damper, the tension line configured to transfer the kinetic energy to the damper upon the rider carrier engaging the stopping member in movement to the destination supporting member.

2. The zipline braking system of claim 1 further comprising a secondary stopping member coupled to the tension line for transferring the kinetic energy to the damper upon the rider carrier engaging the stopping member in movement to the destination supporting member.

3. The zipline braking system of claim 2 further comprising a compression line coupled to the secondary stopping member for transferring the kinetic energy to the damper upon the rider carrier engaging the stopping member in movement to the destination supporting member.

4. The zipline braking system of claim 3 further comprising a block connected to the destination supporting member and movable from the destination supporting member, the block coupled to the compression line.

5. The zipline braking system of claim 2 wherein the secondary stopping member further comprises a foot block.

6. The zipline braking system of claim 5 wherein the tension line is coupled to the secondary stopping member through the foot block.

7. The zipline braking system of claim 5 wherein the compression line is coupled to the secondary stopping member through the foot block.

8. The zipline braking system of claim 5 wherein the tension line is coupled to the secondary stopping member through the foot block.

9. The zipline braking system of claim 1 further comprising a second tension line coupled to the stopping member for transferring the kinetic energy to the damper upon the rider carrier engaging the stopping member in movement towards the destination supporting member.

10. The zipline braking system of claim 1 wherein the damper is a set of springs.

11. The zipline braking system of claim 10 wherein the tension line is connected to a second set of springs.

12. The zipline braking system of claim 1 further comprising an arrester cable coupled to the secondary stopping member and connected to an arrester ballast.

13. The zipline braking system of claim 1 further comprising a clutch coupled to the zipline cable for preventing movement of the stopping member away from the destination supporting member.

14. The zipline braking system of claim 1 A wherein the stopping member comprises:
    a cavity for coupling to the zipline cable; and
    a braking member having an engaged position wherein the braking member frictionally engages the zipline cable to prevent the stopping member from moving in a direction along the zipline cable and a disengaged position wherein the braking member does not engage the zipline cable.

15. The zipline braking system of claim 14 further comprising at least one set of gripping claws for engaging the rider carrier.

16. The zipline braking system of claim 14 wherein the braking member is an eccentrically anchored roller.

17. The zipline braking system of claim 14 wherein the braking member is a braking roller.

18. The zipline braking system of claim 14 wherein the braking member enters the engaged position from the disengaged position upon engagement of the stopping member with the rider carrier.

19. The zipline braking system of claim 18 wherein one or the at least one set or gripping claws causes the braking member to enter the engaged position from the disengaged position upon engagement of the zipline rider stopping member with the rider carrier.

20. The zipline braking system of claim 14 wherein the braking member comprises a brake center.

21. The zipline braking system of claim 1 wherein the damper is a set of springs.

22. The zipline braking system of claim 1 wherein the tension line is connected to a second set of springs.

23. A zipline braking system comprising: a zipline cable and a destination supporting member;
a rider carrier coupled to the zipline cable for movement towards the destination supporting member, such movement generating kinetic energy;
a damper connected to the destination supporting member: a tension line;
a stopping member coupled to the zipline cable and the tension line; a secondary stopping member coupled to the zipline cable and the tension line for transferring the kinetic energy to the damper upon the rider carrier engaging the stopping member in movement to the destination supporting member; and
wherein the secondary stopping member is situated between the stopping member and the damper.

24. The zipline braking system of claim 23 wherein the secondary stopping member further comprises a foot block.

25. The zipline braking system of claim 23 further comprising a second tension line coupled to the stopping member for transferring the kinetic energy to the damper upon the rider carrier engaging the stopping member in movement towards the destination supporting member.

26. A zipline braking system comprising:
a zipline cable and a destination supporting member;
a rider carrier coupled to the zipline cable for movement towards the destination supporting member, such movement generating kinetic energy;
a damper connected to the destination supporting member; a tension line;
a stopping member coupled to the zipline cable and the tension line; and
a bungee block connected to a bungee and the tension line coupled to the bungee block.

27. The zipline braking system of claim 26 the bungee is an anti-slack bungee chord.

* * * * *